US007684953B2

(12) United States Patent
Feist et al.

(10) Patent No.: US 7,684,953 B2
(45) Date of Patent: Mar. 23, 2010

(54) SYSTEMS USING VARIABLE RESISTANCE ZONES AND STOPS FOR GENERATING INPUTS TO AN ELECTRONIC DEVICE

(75) Inventors: David Feist, Campbell, CA (US); Brian St. Jacques, Campbell, CA (US); Michael Rogers, Campbell, CA (US); Archimedes Mandap, Campbell, CA (US); Timothy Martin, Campbell, CA (US); Eric Belford, Sacramento, CA (US)

(73) Assignee: Authentec, Inc., Melbourne, FL (US)

( * ) Notice: Subject to any disclaimer, the term of this patent is extended or adjusted under 35 U.S.C. 154(b) by 142 days.

(21) Appl. No.: 11/705,951

(22) Filed: Feb. 12, 2007

(65) Prior Publication Data

US 2007/0271048 A1 Nov. 22, 2007

Related U.S. Application Data

(60) Provisional application No. 60/772,017, filed on Feb. 10, 2006.

(51) Int. Cl.
*G01L 7/00* (2006.01)
*G06F 19/00* (2006.01)

(52) U.S. Cl. ...................................................... 702/139

(58) Field of Classification Search ................. 702/139, 702/64, 65, 138, 150; 338/13, 169; 715/700, 715/701

See application file for complete search history.

(56) References Cited

U.S. PATENT DOCUMENTS 1,660,161 A 2/1928 Hansen (Continued)

FOREIGN PATENT DOCUMENTS

DE 19606408 A1 8/1997 ................ 338/180

(Continued)

OTHER PUBLICATIONS

Bartholomew J. Kane, "A High Resolution Traction Stress Sensor Array For Use In Robotic Tactile Determination", A Dissertation Submitted to the Department of Mechanical Engineering and the Committee on Graduate Studies of Stanford University in Partial Fulfillment of the Requirements for the Degree of Doctor of Philosophy, Sep. 1999.

(Continued)

*Primary Examiner*—Michael P. Nghiem
*Assistant Examiner*—Cindy H Khuu
(74) *Attorney, Agent, or Firm*—Allen, Dyer, Doppelt, Milbrath & Gilchrist, P.A. Attorneys at Law

(57) ABSTRACT

The present invention is directed to variable resistance zones for sensing input to an electronic device, as well as ministops for controlling deformation of the input components to ensure the accuracy of the inputs sensed. In one embodiment, a system in accordance with the present invention includes multiple variable resistors, an actuator, and a converter. The actuator overlies the multiple pressure-sensitive variable resistors and is configured to generate a pressure at a contact location on the multiple variable resistors. The converter is coupled to the multiple variable resistors and is programmed to map a pressure at the contact location to a pressure, location, or both along the surface of the actuator.

21 Claims, 25 Drawing Sheets

U.S. PATENT DOCUMENTS

| | | | | |
|---|---|---|---|---|
| 1,683,059 | A | 9/1928 | Van Deventer | |
| 3,393,390 | A | 7/1968 | Louis | |
| 3,610,887 | A | 10/1971 | Betzer | 219/501 |
| 3,621,439 | A | 11/1971 | Newbery | 338/180 |
| 3,624,584 | A | 11/1971 | Ohno | 338/69 |
| 3,863,195 | A | 1/1975 | Bowen | 338/183 |
| 3,960,044 | A | 6/1976 | Nagai et al. | 84/1.01 |
| 3,997,863 | A | 12/1976 | Luce | 338/69 |
| 4,079,651 | A | 3/1978 | Matsui | 84/1.01 |
| 4,152,304 | A | 5/1979 | Tadewald | 252/506 |
| 4,257,305 | A | 3/1981 | Friend et al. | 84/1.24 |
| 4,273,682 | A | 6/1981 | Kanamori | 252/511 |
| 4,333,068 | A | 6/1982 | Kishel | 338/158 |
| 4,419,653 | A | 12/1983 | Waigand | 338/114 |
| 4,438,158 | A | 3/1984 | Eichelberger et al. | 427/101 |
| 4,479,392 | A | 10/1984 | Froeb et al. | 73/862.68 |
| 4,604,509 | A | 8/1986 | Clancy et al. | 200/159 B |
| 4,680,577 | A * | 7/1987 | Straayer et al. | 345/160 |
| 4,736,191 | A * | 4/1988 | Matzke et al. | 341/20 |
| 4,745,301 | A | 5/1988 | Michalchik | 307/119 |
| 4,746,894 | A | 5/1988 | Zeldman | 338/99 |
| 4,765,930 | A | 8/1988 | Mashimo et al. | 252/511 |
| 4,769,517 | A * | 9/1988 | Swinney | 200/6 A |
| 4,775,765 | A | 10/1988 | Kimura et al. | 178/18 |
| 4,878,040 | A | 10/1989 | Tamura | 338/158 |
| 4,894,493 | A | 1/1990 | Smith et al. | 200/5 |
| 4,933,660 | A | 6/1990 | Wynne, Jr. | 338/114 |
| 4,952,761 | A | 8/1990 | Viebrantz | 200/513 |
| 5,060,527 | A | 10/1991 | Burgess | 73/862.68 |
| 5,068,638 | A | 11/1991 | Bickely et al. | 338/114 |
| 5,162,775 | A | 11/1992 | Kuramochi et al. | 338/114 |
| 5,164,697 | A | 11/1992 | Kramer | 338/69 |
| 5,283,735 | A * | 2/1994 | Gross et al. | 600/587 |
| 5,296,835 | A | 3/1994 | Nakamura | 338/130 |
| 5,376,913 | A | 12/1994 | Pine et al. | 338/114 |
| 5,429,006 | A | 7/1995 | Tamori | 73/862.046 |
| 5,499,041 | A | 3/1996 | Brandenburg et al. | 345/174 |
| 5,574,668 | A * | 11/1996 | Beaty | 702/150 |
| 5,614,881 | A | 3/1997 | Duggal et al. | 338/22 R |
| 5,644,283 | A | 7/1997 | Grosse-Wilde et al. | 338/20 |
| 5,675,309 | A | 10/1997 | DeVolpi | 338/68 |
| 5,689,285 | A * | 11/1997 | Asher | 345/161 |
| 5,821,930 | A | 10/1998 | Hansen | 345/340 |
| 5,876,106 | A | 3/1999 | Kordecki | 362/29 |
| 5,880,411 | A | 3/1999 | Gillespie et al. | 178/18.01 |
| 5,907,327 | A | 5/1999 | Ogura et al. | 345/339 |
| 5,912,612 | A | 6/1999 | DeVolpi | 338/95 |
| 5,943,052 | A | 8/1999 | Allen et al. | 345/341 |
| 5,945,929 | A | 8/1999 | Westra | 341/34 |
| 5,949,325 | A | 9/1999 | Devolpi | 338/154 |
| 5,999,084 | A | 12/1999 | Armstrong | 338/114 |
| 6,208,271 | B1 | 3/2001 | Armstrong | 341/34 |
| 6,236,034 | B1 | 5/2001 | DeVolpi | 250/221 |
| 6,239,790 | B1 | 5/2001 | Martinelli et al. | 345/174 |
| 6,256,012 | B1 | 7/2001 | Devolpi | 345/161 |
| 6,278,443 | B1 | 8/2001 | Amro et al. | 345/173 |
| 6,313,731 | B1 | 11/2001 | Vance | 338/185 |
| 6,323,846 | B1 | 11/2001 | Westerman et al. | 345/173 |
| 6,344,791 | B1 | 2/2002 | Armstrong | 338/114 |
| 6,400,303 | B2 | 6/2002 | Armstrong | 341/176 |
| 6,404,323 | B1 | 6/2002 | Schrum et al. | 338/92 |
| 6,437,682 | B1 | 8/2002 | Vance | 338/185 |
| 6,563,101 | B1 | 5/2003 | Tullis | 250/208.1 |
| 6,563,415 | B2 * | 5/2003 | Armstrong | 338/47 |
| 6,754,365 | B1 | 6/2004 | Wen et al. | 382/100 |
| 6,885,364 | B1 * | 4/2005 | Ogata et al. | 345/161 |
| 7,003,670 | B2 | 2/2006 | Heaven et al. | 713/186 |
| 7,339,572 | B2 * | 3/2008 | Schena | 345/156 |
| 7,345,670 | B2 * | 3/2008 | Armstrong | 345/156 |
| 7,391,296 | B2 | 6/2008 | Schrum et al. | 338/99 |
| 2001/0012036 | A1 | 8/2001 | Giere et al. | 347/62 |
| 2002/0130673 | A1 | 9/2002 | Pelrine et al. | 324/727 |
| 2003/0002718 | A1 | 1/2003 | Hamid | 382/124 |
| 2003/0028811 | A1 | 2/2003 | Walker et al. | 713/202 |
| 2003/0214481 | A1 | 11/2003 | Xiong | 345/157 |
| 2004/0075676 | A1 * | 4/2004 | Rosenberg et al. | 345/701 |
| 2004/0208348 | A1 | 10/2004 | Baharav et al. | 382/124 |
| 2005/0012714 | A1 | 1/2005 | Russo et al. | 345/157 |
| 2005/0041885 | A1 | 2/2005 | Russo | 382/289 |
| 2005/0179657 | A1 | 8/2005 | Russo et al. | 345/163 |
| 2006/0007172 | A1 * | 1/2006 | Baker et al. | 345/173 |
| 2006/0103633 | A1 | 5/2006 | Gioeli | 345/173 |
| 2007/0061126 | A1 | 3/2007 | Ursso et al. | 703/24 |
| 2007/0146349 | A1 * | 6/2007 | Errico et al. | 345/174 |

FOREIGN PATENT DOCUMENTS

| | | | |
|---|---|---|---|
| JP | 09071135 | | 3/2007 |
| WO | WO 01/39134 | A3 | 5/2001 |
| WO | WO 01/73678 | A1 | 10/2001 |
| WO | WO 01/94892 | A3 | 12/2001 |
| WO | WO 01/94966 | A2 | 12/2001 |
| WO | WO 01/95305 | A1 | 12/2001 |
| WO | WO 02/086800 | A1 | 10/2002 |
| WO | WO 03/075210 | A2 | 9/2003 |

OTHER PUBLICATIONS

U.S. Patent and Trademark Office; Office Action for U.S. Appl. No. 11/701,578 mailed May 16, 2008.

Applicant response to May 16, 2008 U.S. Patent and Trademark Office Action for U.S. Appl. No. 11/701,578.

* cited by examiner

PCB Pattern

Footprint Area

SYSTEMS USING VARIABLE RESISTANCE ZONES AND STOPS FOR GENERATING INPUTS TO AN ELECTRONIC DEVICE

RELATED APPLICATION

This application claims priority under 35 U.S.C. §119(e) of the co-pending U.S. provisional patent application Ser. No. 60/772,017, filed Feb. 10, 2006, and titled "Low Power Navigation Pointing or Haptic Feedback Devices, Methods and Firmware," which is hereby incorporated herein by reference.

FIELD OF THE INVENTION

The present invention is related to input devices for electronic systems. More particularly, the present invention is related to touch pads and navigation systems for sensing and converting signals used by electronic devices.

BACKGROUND OF THE INVENTION

Touch sensors are used on an ever-increasing number of devices. Users enjoy the tactile feel, or haptic sensation, of tapping a surface to launch a program or to select an item from a menu. These haptic sensations also add to the users' sensations and enjoyment when playing computer games.

As one example, touch sensors such as pressure-sensitive discs are used on MP3 digital audio players. A user traces a path along a contact surface of the displacement measuring disc to scroll through menus containing play lists and the like.

These touch sensors have several drawbacks. First, the signals they generate can vary depending on the force that a user applies when contacting the touch sensor. These signals are often dependent on a resistance of a portion of the touch sensor contacted, and this resistance can vary non-uniformly when large forces are exerted on a surface of the touch sensor, such as when a user gets emotionally involved playing a computer game. These forces, when translated into signals used by the computer game, can generate counterintuitive position values.

In addition to the force that a user contacts a touch sensor, the speed with which he contacts the touch sensor can non-uniformly affect the signals generated by the touch sensor.

Some prior art systems, such as force feedback devices, typically provide hard stops to limit the motion of a device such as a joy stick within a constrained range. Sensing the position of the joy stick is exacerbated at the hard stops. For example, when the user moves the joy stick fast against the hard stop, the compliance in the system may allow further motion past the hard stop to be sensed by the sensor due to compliance and inertia. However, when the joy stick is moved slowly, the inertia is not as strong, and the sensor may not read as much extra motion past the hard stop. These two situations can cause problems in sensing an accurate position consistently.

The inconsistent position reporting problem is further exacerbated with variable device joysticks and pointing devices being incorporated into cell phones and personal digital assistants (PDAs) imposing additional restrictions on the height and size of such devices requiring a miniature form factor or elevation.

SUMMARY OF THE INVENTION

In a first aspect of the present invention, a system is used to sense contact on a user input surface, such as a touch pad, and convert the user input to signals usable on an electronic device, such as a cell phone, a digital audio player, and a personal digital assistant, to name only a few devices. In one embodiment, the touch pad functions as a scroll wheel.

In a first aspect of the present invention, the system includes multiple variable resistors arranged in a substrate, an actuator overlying the multiple variable resistors, and a converter coupled to the multiple variable resistors. The actuator is configured to transfer a pressure at a first contact location on a surface of the actuator to a pressure at a second contact location on the multiple pressure-sensitive variable resistors below the first contact location. The converter is programmed to map a pressure at the contact location to a pressure and location along a surface of the actuator. In accordance with one embodiment, the system is able to track where, in what directions, and within how much pressure a finger or other object is pressed against a surface of the actuator.

In one embodiment, the variable resistors are arranged in a closed loop. Movement along the closed loop can thus be tracked, so that the actuator functions as a scroll wheel.

In one embodiment, the multiple variable resistors include a substrate containing multiple conductive elements and multiple resistive members and a voltage source coupled to each of the multiple resistive members. Each of the multiple resistive members overlies and is spaced apart from a corresponding one of the multiple conductive elements. Each of the resistive members is deformable to thereby contact a corresponding one of the multiple conductive elements at a location on the conductive element, thereby generating a voltage differential at the resistive member corresponding to the location on the corresponding conductive element. Preferably, the converter includes an analog-to-digital converter.

The converter is coupled to an electronic device that is programmed to receive rotational information related to the location along the surface of the actuator. The electronic device is a computer gaming device, a digital audio player, a digital camera, a joystick, a mobile phone, a personal computer, a personal digital assistant, or a remote control, to name only a few devices.

Each of the multiple resistive members includes an elastomeric resistive rubber material. Preferably, the substrate further also includes a rigid or semi-rigid material that limits the pressure translated from the actuator to the multiple resistive members. The rigid or semi-rigid material includes a polymer, silicone, silicone derivatives, derivatives, rubber, rubber derivatives, neoprene, neoprene derivatives, elastomers, elastomer derivatives, urethane, urethane derivatives, shape memory materials, or combinations of these. The rigid or semi-rigid material has one a conical surface, a spherical surface, or a flat surface. In one embodiment, the rigid or semi-rigid material forms part of the multiple resistive members.

In a second aspect of the present invention, a method of fabricating a system having multiple variable resistors forming a variable resistance zone includes forming multiple variable resistors in a substrate; positioning an actuator over the multiple pressure-sensitive variable resistors; and coupling a converter to the multiple variable resistors. The actuator is configured to transfer a pressure at a first location on a surface of the actuator to a pressure at a second contact location on the multiple pressure-sensitive variable resistors below the first contact location. And the converter is programmed to map a pressure at the contact location to a pressure and location along a surface of the actuator. Preferably, the multiple variable resistors include multiple conductive elements and multiple resistive members. Each of the multiple resistive members overlies and is spaced apart from a corresponding one of the multiple conductive elements.

The method also includes coupling a voltage source to each of the multiple resistive members. Each of the resistive members is deformable to thereby contact a corresponding one of the multiple conductive elements at a location on the conductive element, thereby generating a voltage differential at the resistive member corresponding to the location on the corresponding conductive element. Preferably, the converter includes an analog-to-digital converter.

The method also includes coupling the converter to an electronic device, which is programmed to receive position information related to the location along the surface of the actuator. The electronic device is a computer gaming device, a digital audio player, a digital camera, a joystick, a mobile phone, a personal computer, a personal digital assistant, or a remote control.

Preferably, each of the multiple resistive members includes an elastomeric resistive rubber material.

The substrate includes a rigid or semi-rigid material that limits the pressure translated from the actuator to the multiple resistive members. The rigid or semi-rigid material includes a polymer, silicone, silicone derivatives, rubber, rubber derivatives, neoprene, neoprene derivatives, elastomers, elastomer derivatives, urethane, urethane derivatives, shape memory materials, or combinations of these. The rigid or semi-rigid material has a conical surface, a spherical surface, or a flat surface. Preferably, the rigid or semi-rigid material forms part of the multiple resistive members.

The resistive material matrix includes silicone, silicone derivatives, rubber, rubber derivatives, neoprene, neoprene derivatives, elastomers, elastomer derivatives, urethane, urethane derivatives, shape memory materials, or combinations of these. Preferably, the touch-sensitive physical sensor is incorporated into a hand-controlled device.

In a third aspect of the present invention, a system for monitoring variable resistances includes a surface for acquiring contact data using multiple variable resistance areas together forming a variable resistance zone and a processor for processing the contact data and generating an event corresponding to the contact data. The event is a navigation pointing event or a haptic feedback event.

DETAILED DESCRIPTION OF THE INVENTION

Figure 1A:
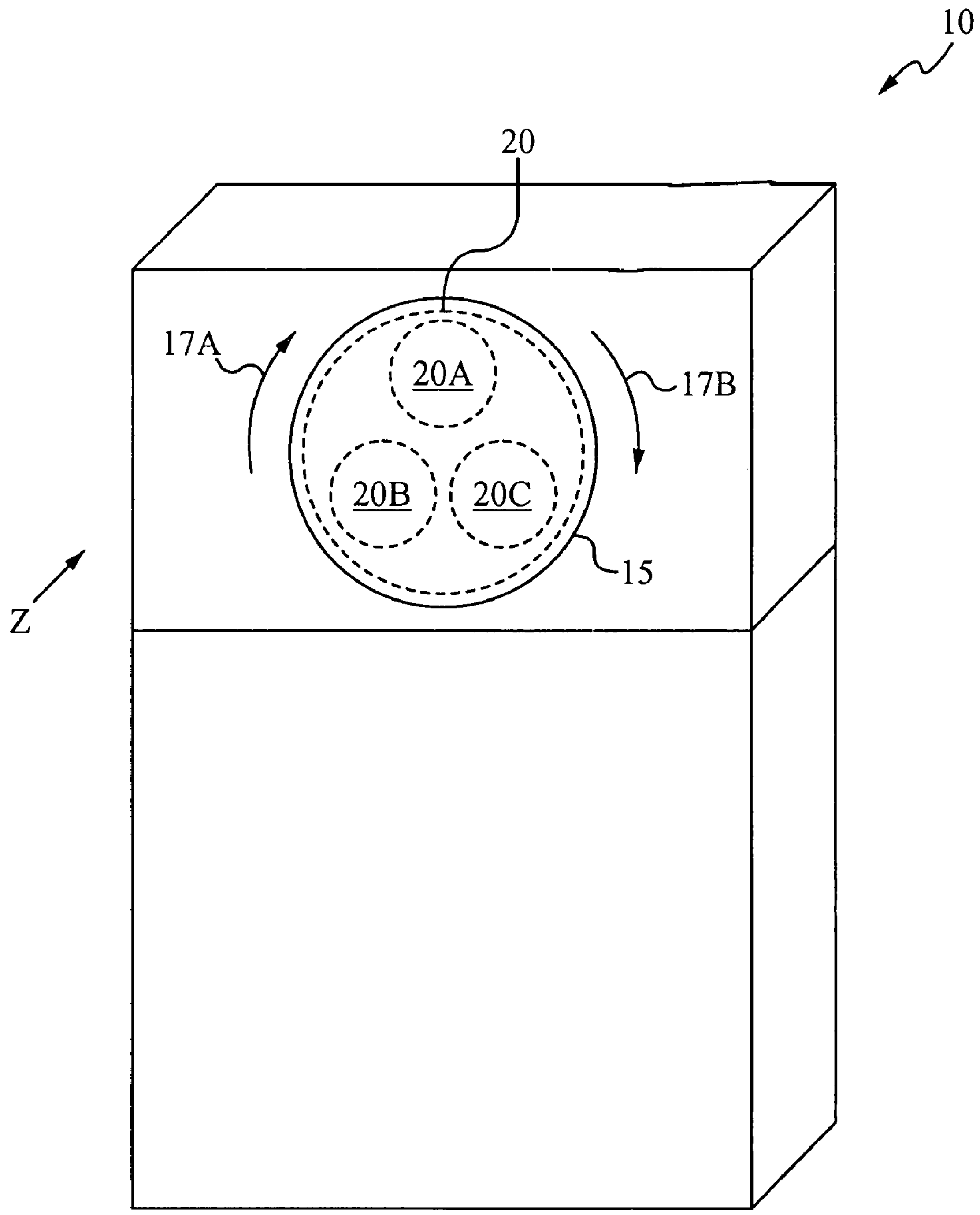
FIG. 1A shows an electronic device with an actuator overlying and coupled to a variable resistance zone for sensing user input in accordance with the present invention.

FIG. 1A shows an electronic device 10 in accordance with one embodiment of the present invention. The electronic device 10 includes an actuator disc 15 (contact area) for sensing user input. Preferably, the displacement of a finger or other object is measured along a surface of the actuator disc. The measured displacement is used to measure movement or pressure along the actuator disc 15 and can thus be used as a touch pad on a gaming device, to emulate a steering wheel, as a scroll wheel on a digital audio device, as a mouse emulator, to name only a few devices. In this example, the actuator disc 15 is a scroll wheel and the electronic device 10 is configured to recognize, among other things, the direction (shown by the clockwise arrow 17A and the counterclockwise arrow 17B) that a user traces his finger along the surface of the actuator disc 15. The actuator disc is also able to identify the force with which a user presses against the actuator disc 15 in the direction shown by the arrow Z.

As described in more detail below, the actuator disc 15 overlies multiple variable resistor devices 20A-C (also called "variable resistors"), which together form a "variable resistor zone" 20. A preferred embodiment has at least three variable resistors. Each of the variable resistance devices 20A-C is coupled to a voltage source. A voltage detected on each of the variable resistance devices 20A-C is dependent on a location and amount of a pressure (e.g., the location of a pressing finger) on the corresponding variable resistance device. In accordance with the present invention, by reading a voltage from each of the variable resistance devices, it can be determined where along the actuator disc 15 a force has been applied (e.g., a finger pressed), as well as the amount of force applied. In other words, by "triangulating" the forces on each of the variable resistance devices 20A-C, a position and pressure on the actuator disc 15 is able to be determined.

Figure 1B:
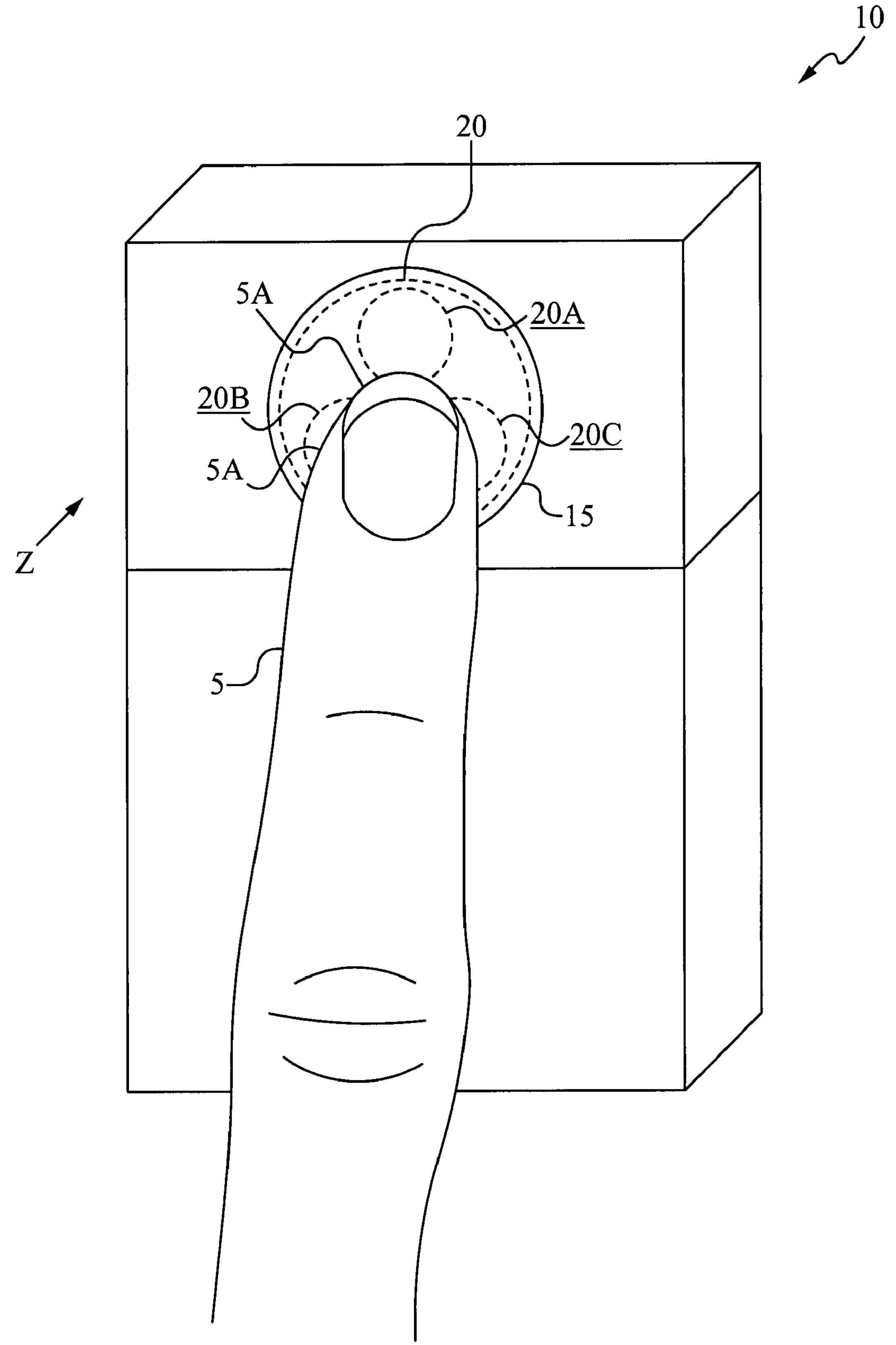
FIG. 1B shows a finger contacting the variable resistance zone of FIG. 1A.

As shown in FIGS. 1A and 1B, the variable resistance devices 20A-C are arranged to form a closed loop. Using this arrangement, the variable resistance devices 20A-C are able to used to generated signals that emulate a scroll wheel, such as one used to scroll through menu items, increase the volume of an electronic device, and perform similar tasks.

As described in more detail below, variable resistance devices in accordance with the present invention are able to be used in many ways to determine the location and pressure of a forces applied to them. Variable resistance devices are described in U.S. Pat. No. 6,404,323, to Schrum et al., titled "Variable Resistance Devices and Methods," which is hereby incorporated by reference.

Figure 2A:
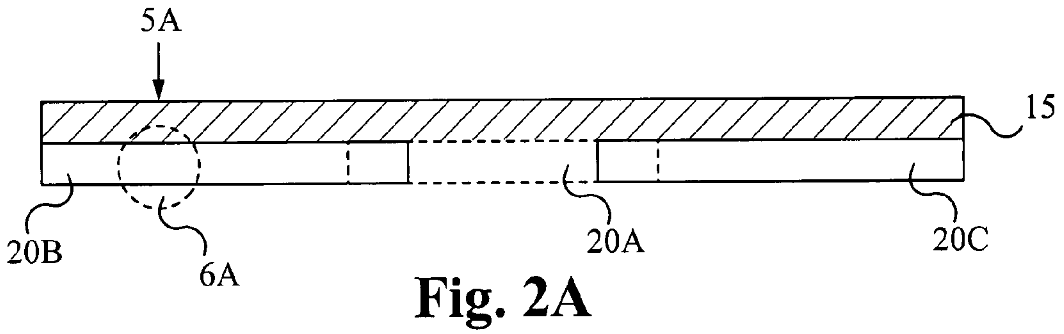
FIGS. 2A-D show an actuator contacting a portion of the variable resistance zone of FIG. 1A, generating signals to determine a location of a finger on the actuator in accordance with the present invention.
Figure 2B:
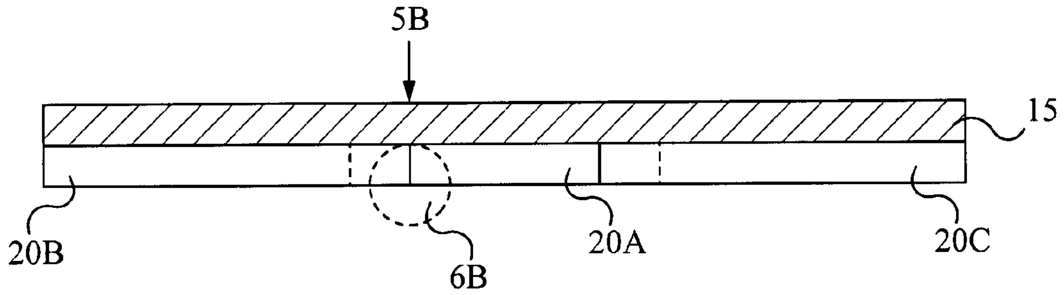

Referring to FIG. 1B, when a finger 5 contacts the disc actuator 15 at a location 5A, thereby deforming portions of the variable resistors 20A-C, the resistance of each of the variable resistors 20A-C changes in response to the location and size of the force applied by the finger 5 to the surface above each of the variable resistors. FIGS. 2A-D are cross-sectional views of the disc actuator 15 overlying the variable resistors 20A-C, with forces (5A-C) applied at different locations on the disc actuator 15. For example, FIG. 2A shows a force applied at the location 5A of the disc actuator 15, resulting in a corresponding force at the location 6A of the variable resistor 20B. Similarly, FIG. 2B shows a force applied at the location 5B of the disc actuator 15, resulting in a corresponding force at the location 6B of the variable resistors 20A and 20B.

Figure 2C:
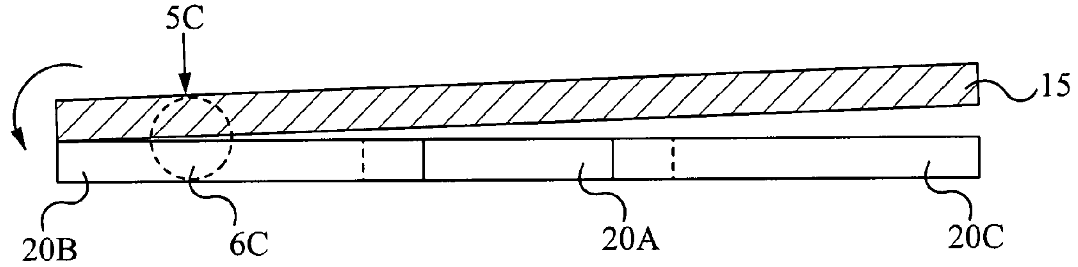

Referring to FIGS. 2A-C, the variable resistor 20A is shown in phantom because its edges overlap portions of the variable resistors 20B and 20C.

Figure 2D:
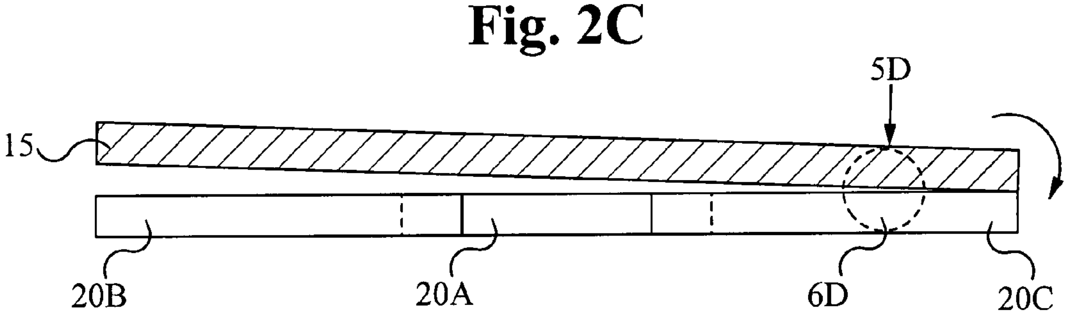

In the embodiment shown in FIGS. 2C and 2D, the disc actuator 15 rocks about a pivot point (now shown) as shown by the curved arrows. FIG. 2C shows the disc actuator 15 pivoting in a counterclockwise direction to contact the variable resistor 20B at the location 6C; FIG. 2D shows the disc actuator 15 pivoting in a clockwise direction to contact the variable resistor 20A at the location 6D. Those skilled in the art will recognize many ways for configuring the disc actuator 15 to contact the variable resistors 20A-C in the variable resistance zone 20.

While FIGS. 2C and 2D show an actuator being tilted, and thus rigid, to make contact with an underlying surface to change the resistance of a variable resistor, it will be appreciated that actuators can be manipulated in other ways to control resistances and thus generated voltages and currents. In some embodiments, for example, an actuator is deformable so that a force applied to it forces it against the underlying surface. Those skilled in the art will recognize other ways to manipulate actuators in accordance with the present invention.

Voltages, currents, or other signals generated by the variable resistors 20A-C are coupled to a microprocessor, which translates the voltages into digital signals that correspond to the location of a finger on a surface of the disc actuator 15. The digital signals are used as positional, rotational, pressure or other input to an application program on the electronic device

10, such as input to control a game executing on the electronic device 10 or to control a menu displayed on the electronic device 10.

Figure 3A:
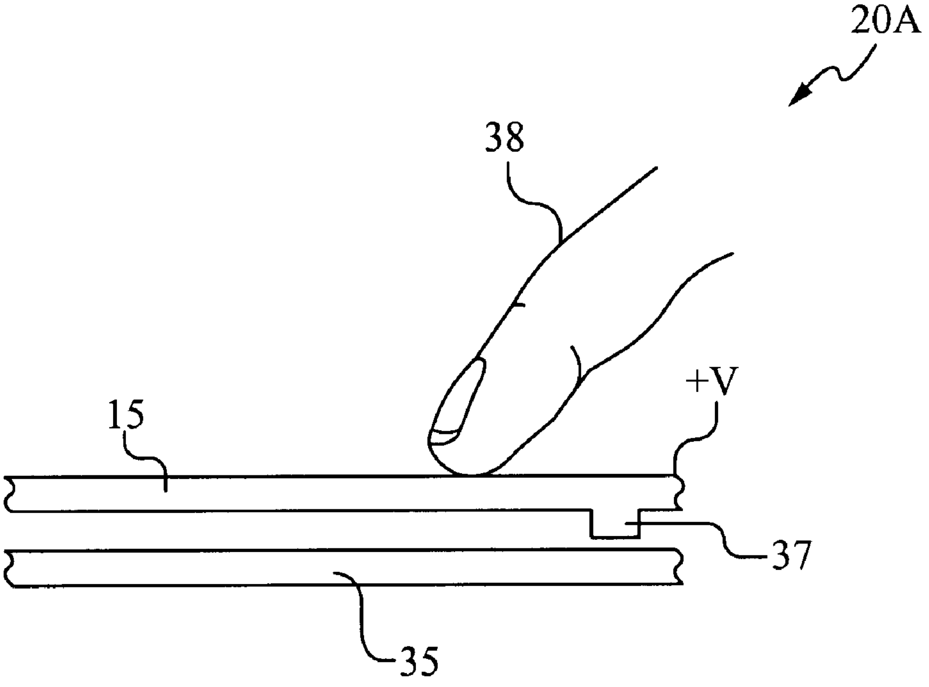
FIG. 3A is a cross-sectional diagram of a finger contacting a portion of the variable resistance zone of FIG. 1A, with a stop forming part of the actuator in accordance with the present invention.

FIG. 3A is a side cross-sectional view of the variable resistance device 20A shown in FIG. 1A. As described in more detail below, the variable resistance device 20A includes the rigid resistive actuator (resilient transducer) 15 and a conductive substrate 35. The transducer 15 is coupled to a voltage source +V and has a rigid stop 37 that limits the deformation of the actuator 15. The voltage generated by the variable resistance device 20A is dependent on a location on the actuator 15 that the finger 38 contacts it.

Figure 3B:
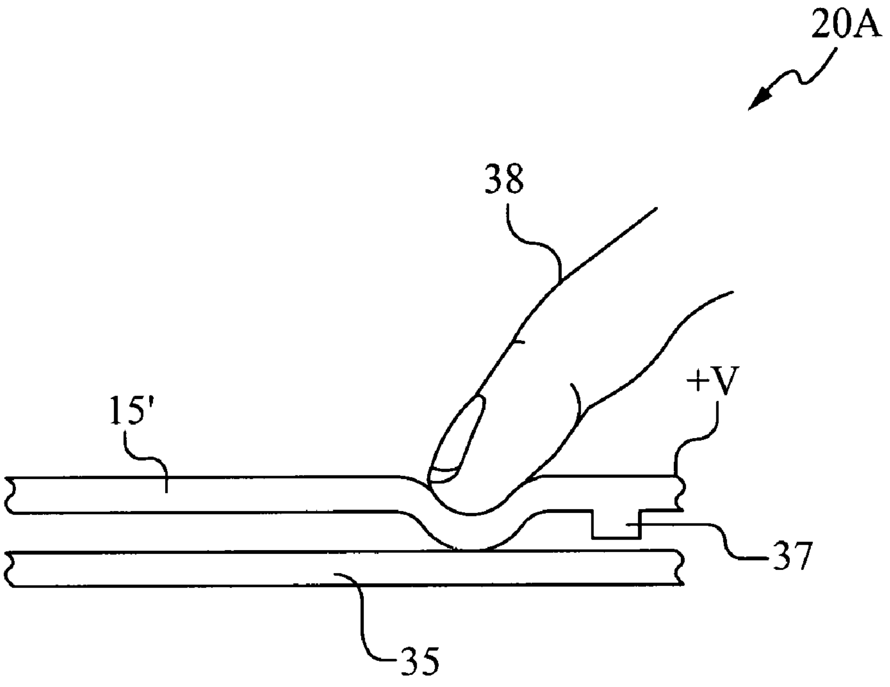
FIG. 3B is a cross-sectional diagram of a finger contacting a portion of the variable resistance zone of FIG. 1A, with a stop forming part of the actuator in accordance with the present invention.

FIG. 3B is a side cross-sectional view of the variable resistance device 20A, with a deformable actuator 15', also having the rigid stop 37.

In one embodiment, the rigid stop 37 is a closed loop, enclosing the entire variable resistance zone 20 of FIG. 1A. In other embodiments, the rigid stop 37 includes discrete "feet" that travel along a circumference that encloses the variable resistance zone 20. These feet can be square elements, conical elements that taper as they extend to the element 35, cubic, rectangular, or any other geometric and non-geometric shape.

Figure 3C:
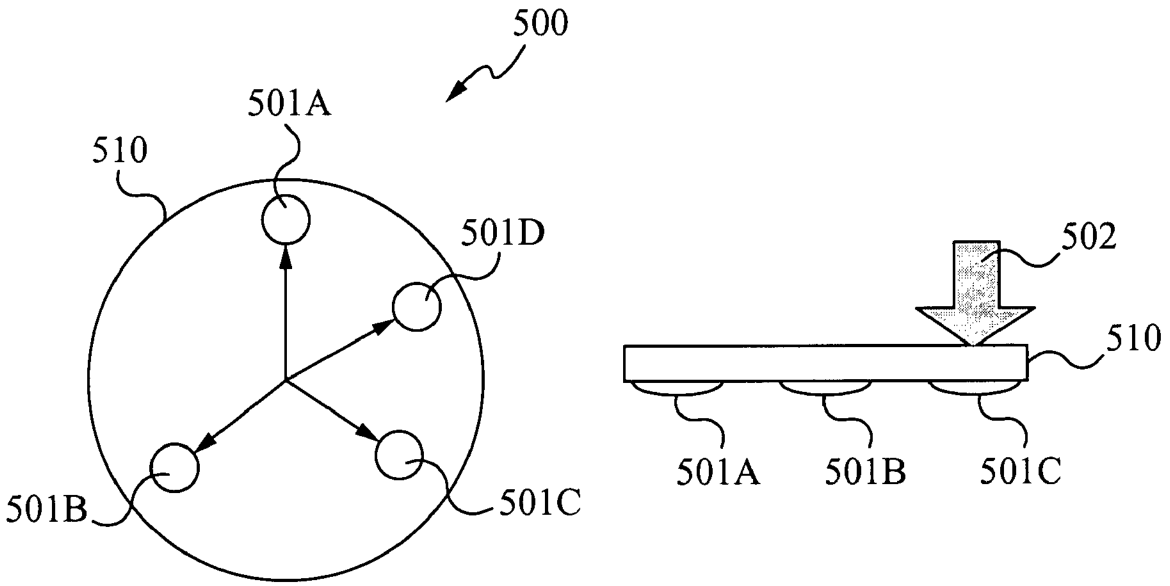
FIG. 3C shows top and side views of an actuator and variable resistors in accordance with the present invention.

FIGS. 3C-J are used to illustrate how a force applied to an actuator is translated to positional and pressure information in accordance with the present invention. FIG. 3C shows a system 500 with an actuator 510, in which the position of a force corresponds to a direction a finger or other object traverses over a surface of the actuator. In the embodiment shown in FIG. 3C, the actuator 510 is circular. The arrow 502 shows a force (pressure) applied to the surface of the actuator 510. In one embodiment, the position of the applied pressure in relation to the perimeters of the actuator 510 determined the direction of movement, and the amount of force (Z-axis force) determines the magnitude of the movement.

In one embodiment, systems in accordance with the present invention are able to detect the position and magnitude of a force applied to an actuator by placing an array of transducers on the bottom side of the actuator disc. The transducers experience a geometric change as a function of the force, which is measured by interfacing the transducers with a printed circuit board (PCB) trace pattern as part of the transducer detection circuit. The transducers use a geometric profile (e.g., spherical or conical) molded into an elastic, electrically resistive material. As force is applied to compress the transducer element between the actuator and the PCB surface, an increasing contact area (footprint) is created on the PCB surface. A measurable resistance change at the PCB contacts results as a function of the transducer footprint size: the larger the footprint area, the lower the resistance.

Figure 3D:
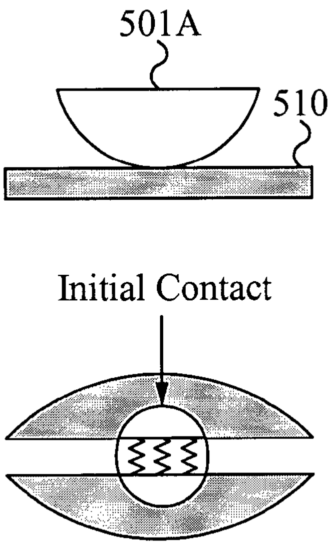
FIGS. 3D-F show how the resistance of a variable resistor in FIG. 3C changes based on the force applied to a surface of an actuator.
Figure 3E:
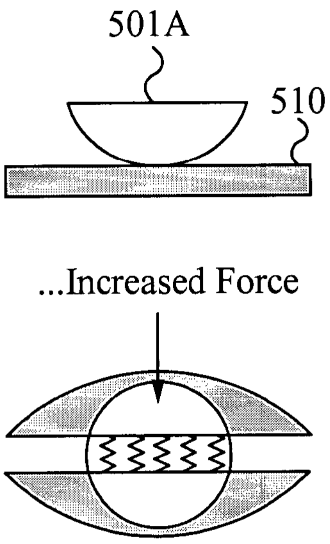
Figure 3F:
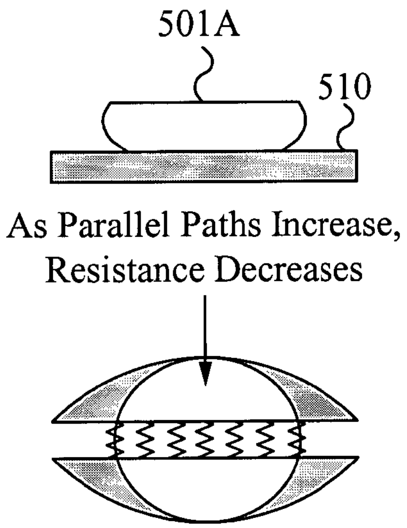

FIGS. 3D-F show how a force applied to the transducer 501A in FIG. 3C changes the shape of the transducer 501A increases from FIG. 3D to FIG. 3E and FIG. 3E to 3F.

The PCB contacts are used in a transducer detection circuit that produces a variable output voltage proportional to the resistance change of the transducers. The variable output voltage is coupled to an analog-to-digital converter to provide an input to a software application program.

Preferably, a single transducer provides feedback based only on a magnitude of a force applied to the transducer. Directional information is derived by placing multiple transducers along a perimeter of an actuator. The proportion of voltage output between the directional regions allows a determination to be made about the position of the applied force on the top surface of the actuator.

Figure 3G:
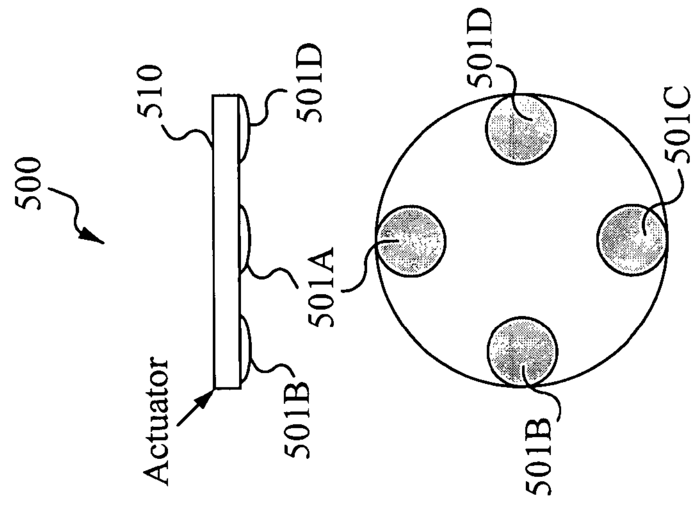
FIGS. 3G-3J show how a footprint of the actuator and variable resistors in FIG. 3C changes based on a force applied to the actuator.
Figure 3H:
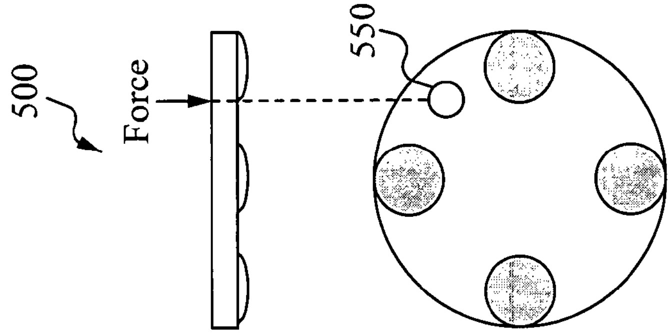
Figure 3I:
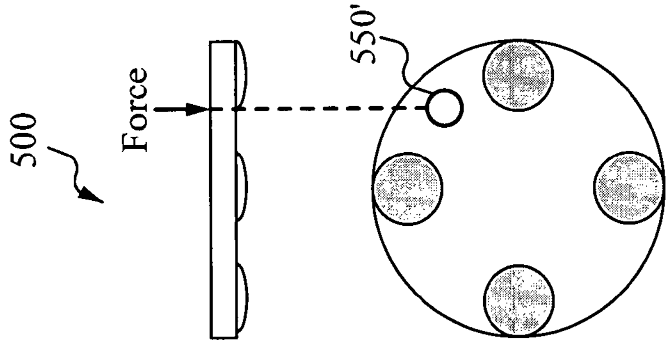
Figure 3J:
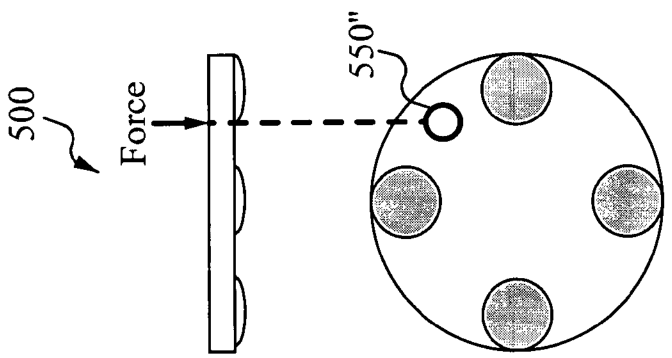

FIG. 3G-J also shows force footprints (550, 550', 550") for the system 500 when increasing forces applied to the actuator 510. FIG. 3G shows the system when no force is applied; FIG. 3H shows the footprint 550 when a light touch at 45 degrees is applied; FIG. 3I shows the footprint 550' when a heavy touch at 45 degrees is applied; and FIG. 3J shows the footprint 550" when a heavy touch at 22.5 degrees is applied.

As explained below, there are other ways to determine direction and pressure on the surface of an actuator in accordance with the present invention.

Figure 4A:
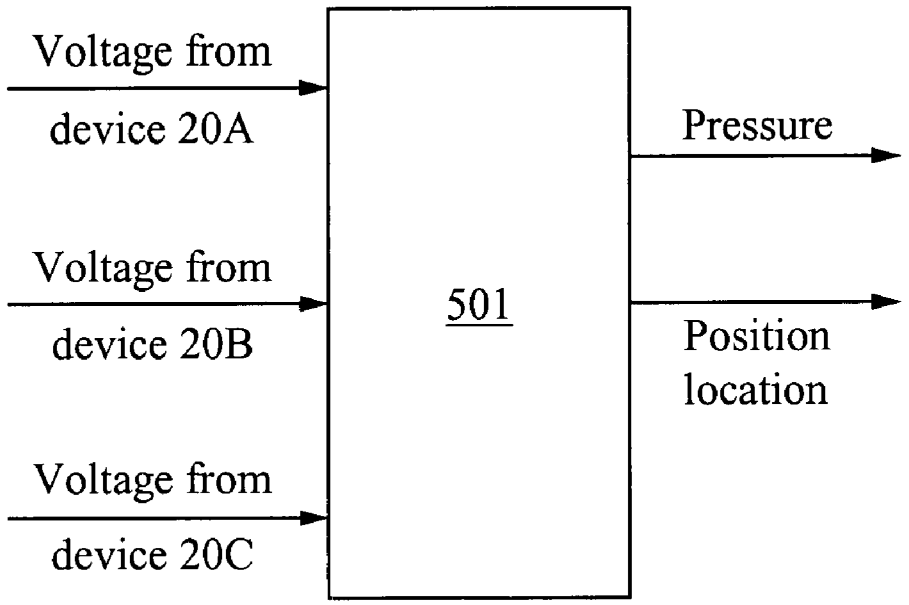
FIG. 4A is a block diagram of a converter for converting signals from variable resistors into pressure and position location, in accordance with the present invention.

FIG. 4A is a block diagram of a converter 501 in accordance with one embodiment of the present invention. The converter 501 receives inputs generated at the variable resistance devices 20A-C and generates a position location and a pressure value. In one embodiment, the position location is generated by correlating the voltages generated at the variable resistance devices 20A-C. In one embodiment, the pressure value is generated by summing all the voltages generated by the variable resistance devices 20A-C.

Figure 4B:
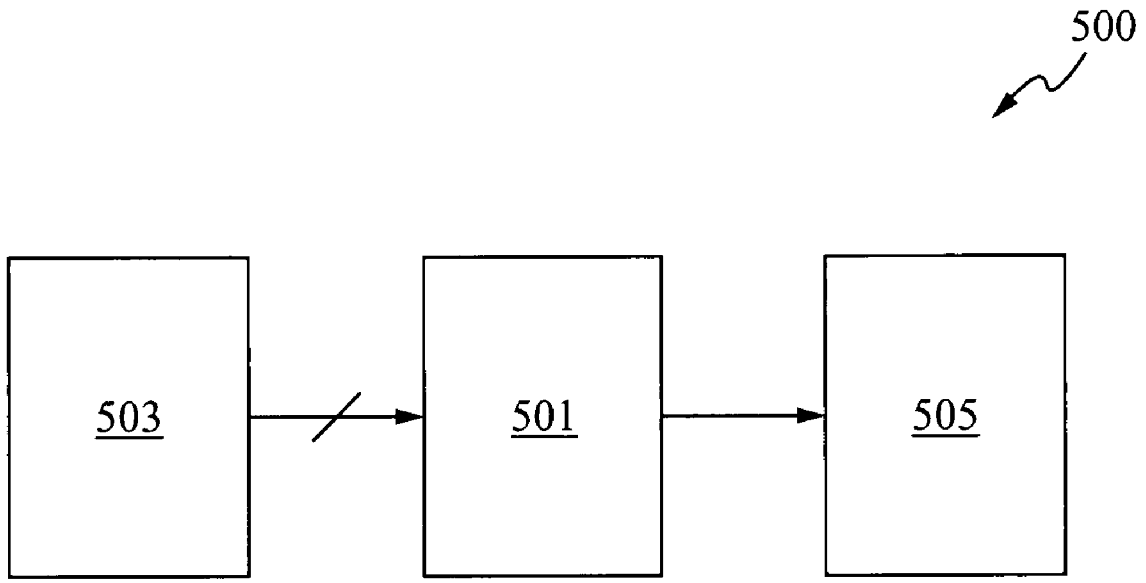
FIG. 4B is a block diagram of components of a system in accordance with the present invention.

FIG. 4B shows the components of a system 500 in accordance with one embodiment of the present invention. The system 500 includes a sensing component 501, which includes a variable resistance zone, the converter 501, and an electronic device platform 505. Preferably, the elements 500, 503, and 505 are integrated onto a single unit, such as a mobile phone, a personal digital assistant, a digital camera, an a digital audio player, to name only a few devices.

A more detailed description of variable resistance devices and stops, both rigid and semi-rigid, are now given. Ministops limit the force applied to the sensor material and distribute any force overloads into a rigid stop, while maintaining the necessary actuation motion to use electronic devices that depend on applied forces, such as touch pads, joy sticks, and the like.

When used with touch pads, stops are used to "cap" output signals. As a user presses down on an actuator, the sensing material will deform and generate a variable output signal until a stop engages the substrate, preventing further compression of the sensor.

Variable Resistance Devices

The variable resistance devices of the present invention include components made of resistive resilient materials.

One example of a variable resistance device is a durometer rubber having a carbon or a carbon-like material imbedded therein. The resistive resilient material advantageously has a substantially uniform or homogeneous resistivity, which is typically formed using very fine resistive particles that are mixed in the rubber for a long period of time in the forming process. The resistive property of resistive resilient material is typically measured in terms of resistance per a square block or sheet of the material. The resistance of a square block or sheet of a resistive resilient material measured across opposite edges of the square is constant without regard to the size of the square. This property arises from the counteracting nature of the resistance-in-series component and resistance-in-parallel component which make up the effective resistance of the square of material. For instance, when two square blocks of resistive resilient material each having a resistance of 1 ohm across opposite edges are joined in series, the effective resistance becomes 2 ohms due to the doubling of the length. By coupling two additional square blocks along the side of the first two square blocks to form a large square, the effective resistance is the reciprocal of the sum of the reciprocals. The sum of the reciprocals is 1/(½ ohm+½ ohm)=1 ohm. Thus the effective resistance for a large square that is made up of 4 small squares is 1 ohm, which is the same as the resistance of each small square. The use of the resistance-in-series or straight path resistance component and the resistance-in-parallel or parallel path resistance component of the resistive resilient material is discussed in more detail below.

The resistance per square of the resistive resilient material employed typically falls within the range of about 10-100 ohms per square. In some applications, the variable resistance device has a moderate resistance below about 50,000 ohms. In certain applications involving joysticks or other pointing devices, the range of resistance is typically between about 1,000 and 25,000 ohms. Advantageously, the resistive resilient material is able to be formed into any desirable shape, and a wide range of resistivity for the material is able to be obtained by varying the amount of resistive particles embedded in the resilient material.

The resistive response of a variable resistance device made of a resistive resilient material can be attributed to three categories of characteristics: material characteristics, electrical characteristics, and mechanical characteristics.

A. Material Characteristics

The resistance of a resistive resilient material increases when it is subjected to stretching and decreases when it is subjected to compression or pressure. The deformability of the resistive resilient material renders it more versatile than materials that are not as deformable as the resistive resilient material. The resistance of a resistive resilient material increases with an increase in temperature and decreases with a decrease in temperature.

B. Electrical Characteristics

The effective resistance of a resistive resilient component is generally the combination of a straight path resistance component and a parallel path resistance component. The straight path resistance component or straight resistance component is analogous to resistors in series in that the straight resistance component between two contact locations increases with an increase in distance between the two contact locations, just as the effective resistance increases when the number of discrete resistors joined in series increases. The parallel path resistance component is analogous to resistors in parallel in that the parallel path resistance component decreases when the number of parallel paths increases between two contact locations due to changes in geometry or contact variances, just as the effective resistance decreases when the number of discrete resistors joined in parallel increases, representing an increase in the amount of parallel paths.

To demonstrate the straight resistance characteristics and parallel path resistance characteristics, specific examples of variable resistance devices are described herein. In some examples, straight resistance is the primary mode of operation. In other examples, parallel path resistance characteristics are dominant.

1. Straight Path Resistance

One way to provide a variable resistance device that operates primarily in the straight resistance mode is to maintain the parallel path resistance component at a level which is at least substantially constant with respect to changes in the distance between the contact locations. The parallel path resistance component varies with changes in geometry and contact variances. The parallel path resistance component can be kept substantially constant if, for example, the geometry of the variable resistance device, the contact locations, and the contact areas are selected such that the amount of parallel paths between the contact locations remains substantially unchanged when the contact locations are moved.

Figure 5A:
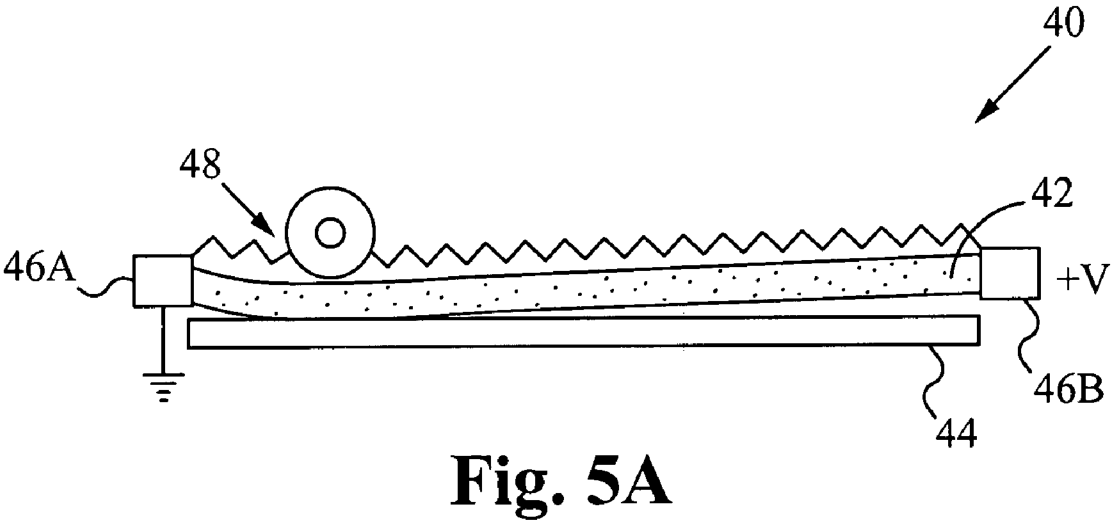
FIGS. 5*a-c* show several view of a variable resistance device exhibiting effective straight resistance characteristics in accordance with one embodiment of the present invention.
Figure 5B:
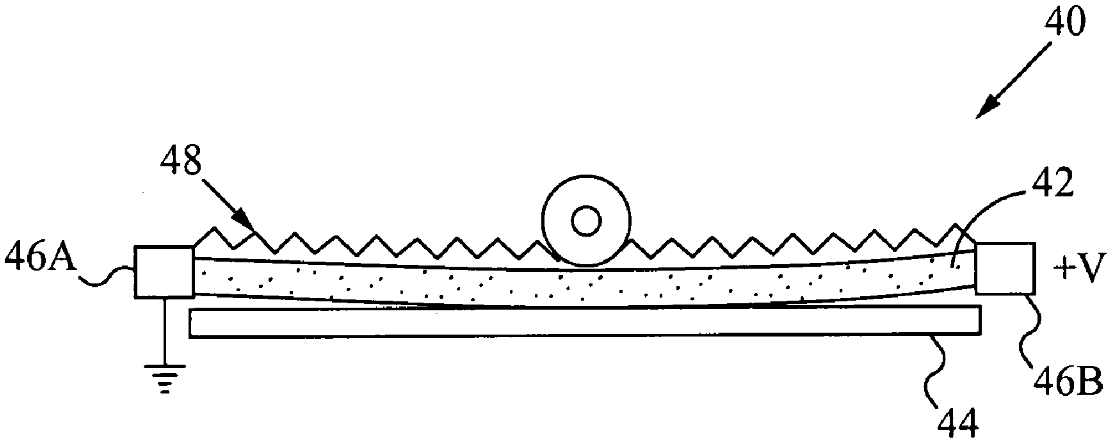
Figure 5C:
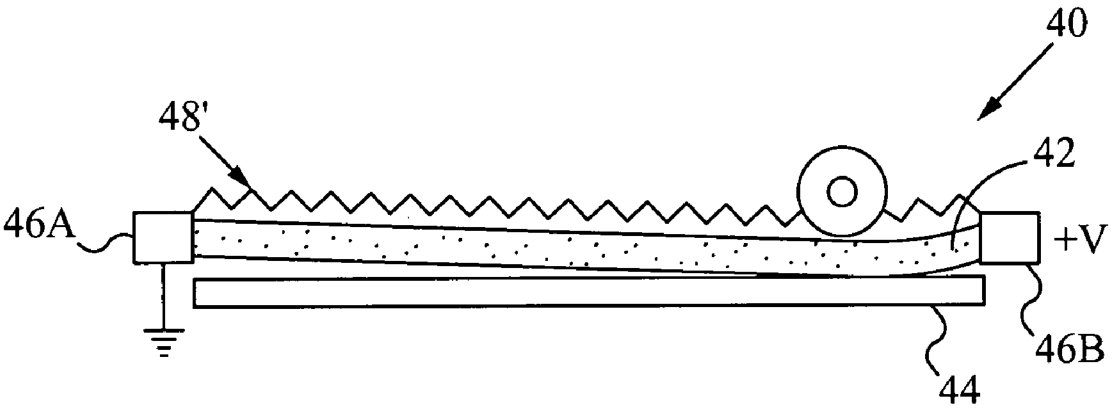
Figure 5D:
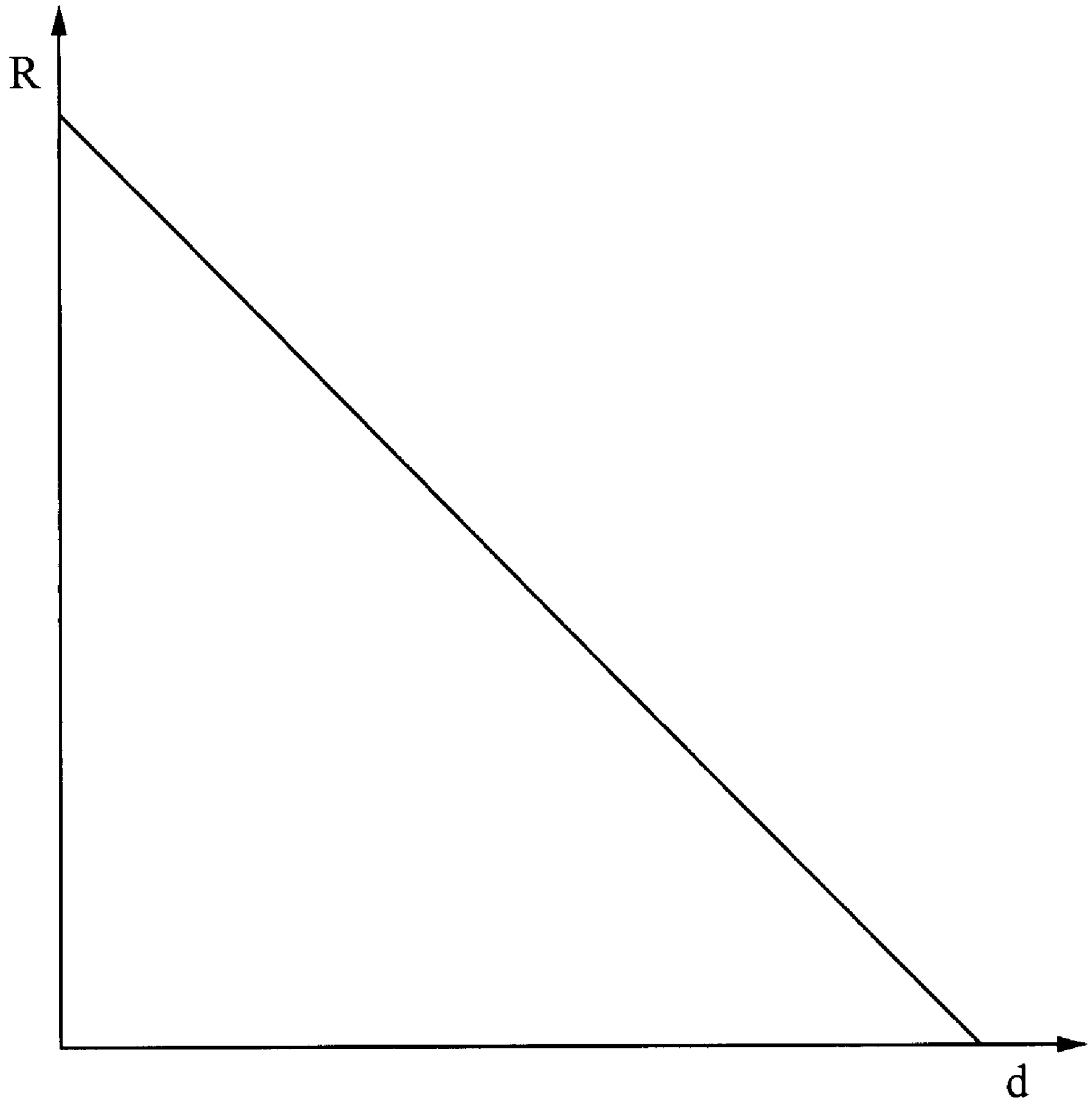
FIG. 5*d* is a plot of the effective resistance as a function of the contact location for the variable resistance device of FIGS. 5*a-c*.

One example of a device having parallel paths is a potentiometer 40 shown in FIGS. 5*a-c*. In the potentiometer 10, a resistive resilient transducer 42 is disposed adjacent and generally parallel to a conductor or conductive substrate 44. The resistive resilient transducer 42 is supported at two ends by end supports 46*a*, 46*b*, and is normally spaced from the conductor 44 by a small distance. A roller or wheel mechanism 48 is provided for applying a force on the transducer 42 to deflect the transducer 42 to make contact with the conductor 44 at different locations between the two ends of the transducer 14, as illustrated in FIGS. 5*a-c*. In this embodiment, one end of the transducer 42 adjacent to the first end support 46*a* is grounded and the other end adjacent to the second end support 46*b* is energized with an applied voltage V. As the roller mechanism 48 deflects the transducer 42 to contact the conductor 44 at different locations, voltage measurements taken along the length of the transducer 42 increases as the contact location approaches the end support 46*b*, the end with the voltage V. Also, resistance readings R taken at the contact locations d vary between the two ends of the transducer 42. The value d varies between a value at the support 16*a* and a value at the support 16*b*, as shown in the plot in FIG. 5*d*.

Figure 6:
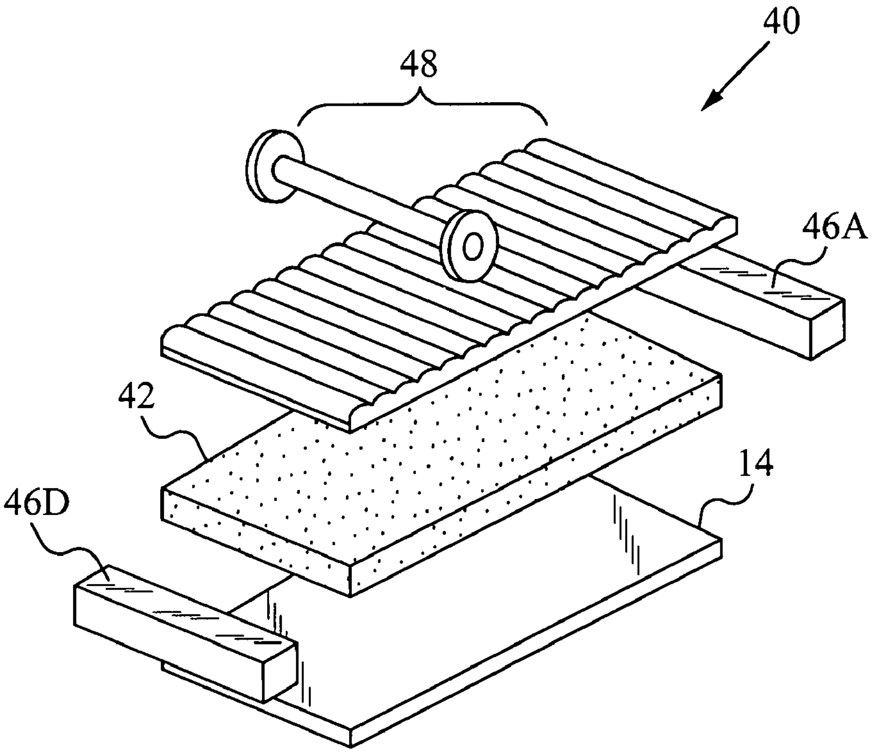
FIG. 6 is a perspective view of the variable resistance device of FIGS. 5*a-c*.

FIG. 6 is a perspective view of the potentiometer 40 of FIGS. 5*a-c*. Throughout this Specification, like-numbered elements refer to the same element. FIG. 6 shows that the transducer 42 and conductor 44 have generally constant widths and the roller mechanism 48 is set up so that the contact area between the transducer 42 and the conductor 44 remains generally constant at different contact locations. The contact area preferably extends across the entire width of the transducer 42 which amounts to a substantial portion (almost half) of the perimeter of the cross-section of the transducer 42 at the contact location. The resistive resilient transducer 42 has a substantially uniform cross-section, and the resistive resilient material preferably has substantially uniform resistive properties. The voltage V is applied at the end of the transducer 42 substantially across its entire cross-section. In one embodiment, this is done by capping the entire end of the transducer 42 with a conductive cap or conductive end support 46*b* and applying the voltage through the conductive end support 46*b*. The other end of the transducer 42 is grounded, preferably also across the entire cross-section, for instance, by capping the end with a grounded conductive end support 46*a*. Alternatively, this end near the end support 46*a* is energized with a voltage different from the voltage V, thereby creating a voltage differential between the two ends of the transducer 42. Referring to FIG. 6, in a specific embodiment, the resistive resilient transducer 42 has a thickness T which is significantly smaller than its width W and length L (e.g., the width is at least about 5 times the thickness), so that the transducer 12 is a thin strip, which is flat and straight in the embodiment shown.

Current flows from the applied voltage end of the transducer 42 (adjacent to 46*b*) to the grounded end of the transducer 42 (adjacent to 46*a*) via parallel paths that extend along the length L of the transducer 42. For the variable resistance device 40, the contact area between the resistive resilient transducer 42 and the conductor 44 is substantially constant and the amount of parallel paths remains substantially unchanged as the contact location is moved across the length of the transducer. As a result, the parallel path resistance component is kept substantially constant, so that the change in the effective resistance of the device 40 due to a change in contact location is substantially equal to the change in the straight resistance component. The straight resistance component typically varies in a substantially linear fashion with respect to the displacement of the contact location because of the uniform geometry and homogeneous resistive properties of the resistive resilient material (see FIG. 5*d*).

Figure 7:
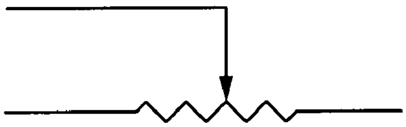
FIG. 7 is a schematic view of the variable resistance device of FIGS. 5*a-c*.

FIG. 7 is a schematic representation of the potentiometer 40 of FIGS. 5*a-c*.

Figure 8:
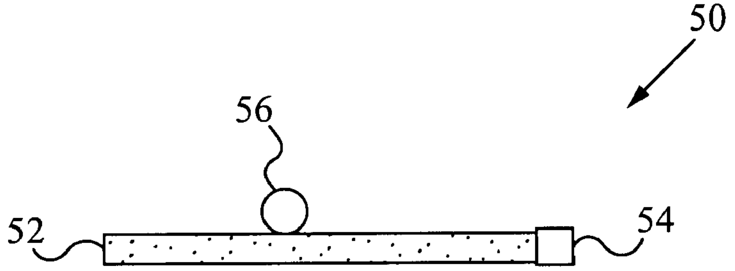
FIG. 8 is a side cross-sectional view of a variable resistance device exhibiting effective straight resistance characteristics in accordance with another embodiment of the invention.

Another variable resistance device 50 which also operates primarily on straight resistance principles is shown in FIG. 8. The device 50 includes a generally longitudinal resistive resilient member 52 which is substantially uniform in cross-section. As one example, the member 52 is generally identical to the resistive resilient transducer 42 in FIG. 6. One end of the resistive resilient member 52 is coupled to a first conductor 54, preferably across substantially the entire cross-section of the resilient member 52. A second conductor 56 makes movable contact with the resistive resilient member 52 along its length in the direction shown by the arrows to define a variable distance with respect to the first conductor 54. In this embodiment, the movable conductor 56 includes a roller with a curved surface which makes rolling contact on the surface of the resistive resilient member 52. The contact area between the movable conductor 56 and the resistive resilient member 52 is substantially constant, and preferably extends across the entire width of the member 52, which amounts to a substantial portion (almost half) of the perimeter of the cross-section of the member 52 at the contact location. In this way, the amount of parallel paths between the first conductor 54 and the second conductor 56 is substantially unchanged during movement of the second conductor 56 relative to the first conductor 54. The effective resistance of the variable resistance device 50 exhibits straight resistance characteristics, and increases or decreases when the variable distance between the first conductor 54 and the second conductor 56 increases or decreases respectively. If the resistive properties of the resistive resilient material are substantially uniform, the effective resistance varies substantially linearly with respect to changes in the distance between the first conductor 54 and the second conductor 56 in a manner similar to that shown in FIG. 5*d*.

Figure 9A:
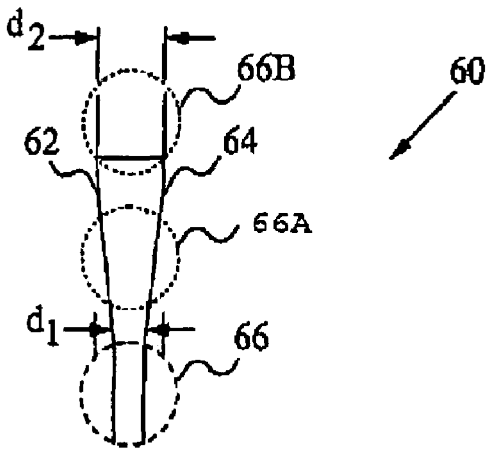
FIG. 9*a* is a top view of a variable resistance device exhibiting effective straight resistance characteristics in accordance with another embodiment of the invention.
Figure 9B:
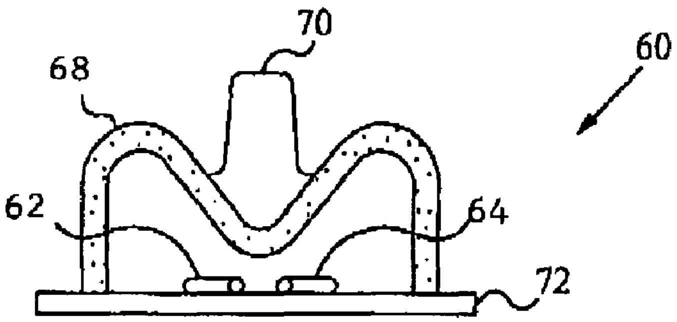
FIG. 9*b* is a side cross-sectional view of the variable resistance device of FIG. 8*a*.

Another example of a variable resistance device 60, shown in FIGS. 9*a* and 9*b*, employs two conductors 62, 64 in tandem. The conductor surfaces of the two conductors 62, 64 which are provided for making contact with a resistive surface or footprint 66 are spaced from each other by a variable distance. In the embodiment shown, the conductors 62, 64 are longitudinal members with substantially constant widths, and the distance between them increases from one end of each conductor 62, 64 to the other end. The resistive footprint 66 movably contacts the first conductor surface of the first conductor 32 over a first contact area and the second conductor surface of the second conductor 64 over a second contact area. FIG. 9*a* shows movement of the footprint 66 to positions 66*a*, 66*b*. The first contact area and second contact area respectively remain substantially constant during movement of the footprint 66 to positions 66*a*, 66*b* in the embodiment shown, and the resistive footprint 66 is substantially constant in area and circular in shape. FIG. 9*b* shows an embodiment of a resistive resilient member 68 which provides the circular resistive footprint 66. The resistive resilient member 68 includes a curved resistive surface 68 which is manipulated by a stick or joystick 70 to make rolling contact with the conductors 62, 64.

In the embodiment shown, the conductors 62, 64 are disposed on a substrate 72, and the resistive resilient member 68 is resiliently supported on the substrate 72. When a force is applied on the joystick 70 to push the resistive resilient member 68 down toward the substrate 72, it forms the resistive footprint 66 in contact with the conductors 62, 64. When the force shifts in the direction of the conductors 62, 64, the footprint 66 moves to locations 66*a*, 66*b*. When the force is removed, the resilient resistive resilient member 68 is configured to return to the rest position shown in FIG. 9*b* above the conductors 62, 64. The resistive resilient member 68 preferably has a thickness which is substantially less than a square root of the area of the resistive footprint 66. As one example, the thickness is less than about ⅕ of the square root of the area of the resistive footprint 66.

The resistive footprint 66 bridges across the two conductor surfaces defined by an average distance over the footprint 66. The use of an average distance is necessary because the distance is typically variable within a footprint. Given the geometry of the variable resistance device 60 and the contact locations and generally constant contact areas between the conductors 62, 64 and the footprint 66 of the resistive resilient member 38, the amount of parallel paths between the two conductors 62, 64 is substantially unchanged. As a result, the change in the effective resistance is substantially governed by the change in the straight resistance component of the device 60, which increases or decreases with an increase or decrease, respectively, of the average distance between the portions of the conductor surfaces of the two conductors 62, 64 which are in contact with the resistive footprint 66. If the average distance varies substantially linearly with displacement of the resistive footprint 66 relative to the conductors 62, 64 (e.g., from $d_1$ to $d_2$ as shown for a portion of the conductors 62, 64 in FIG. 9*a*), and the resistive properties of the resistive resilient material are substantially constant, then the effective resistance also varies substantially linearly with the displacement of the footprint 66. Alternatively, a particular nonlinear resistance curve can result by arranging the conductors 62, 64 to define a specific variation in the average distance between them (e.g., logarithmic variations).

2. Parallel Path Resistance

Figure 10A:
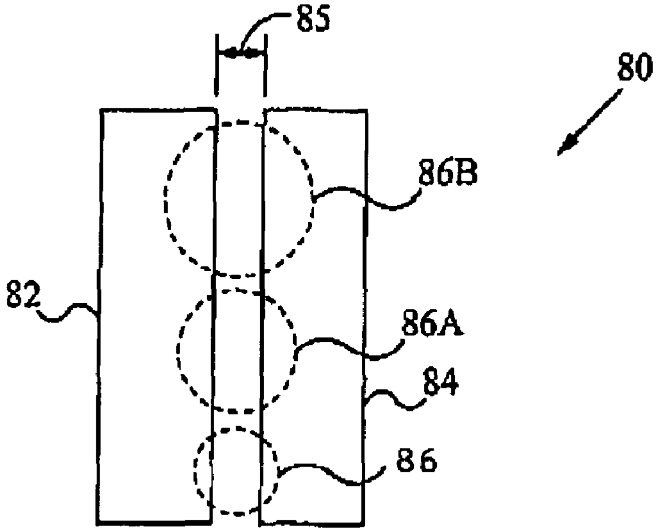
FIG. 10*a* is a top view of a variable resistance device exhibiting effective parallel path resistance characteristics in accordance with one embodiment of the invention.
Figure 10B:
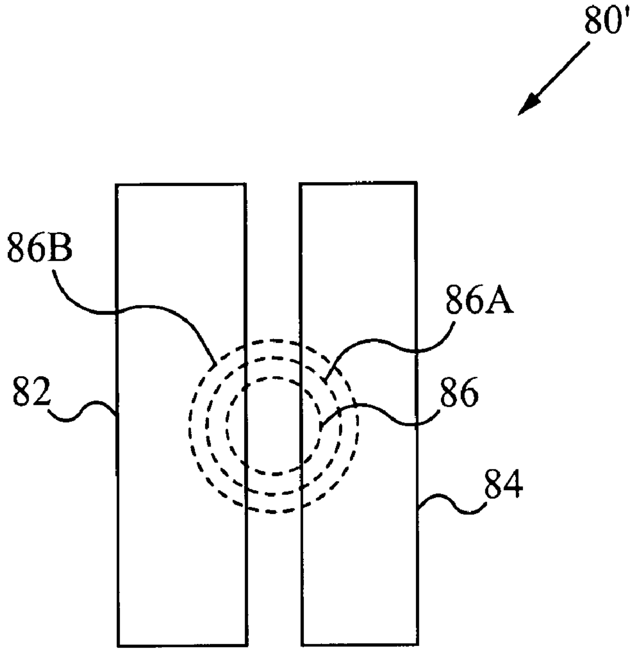
FIG. 10*b* is a top view of a variable resistance device exhibiting effective parallel path resistance characteristics in accordance with another embodiment of the invention.
Figure 11:
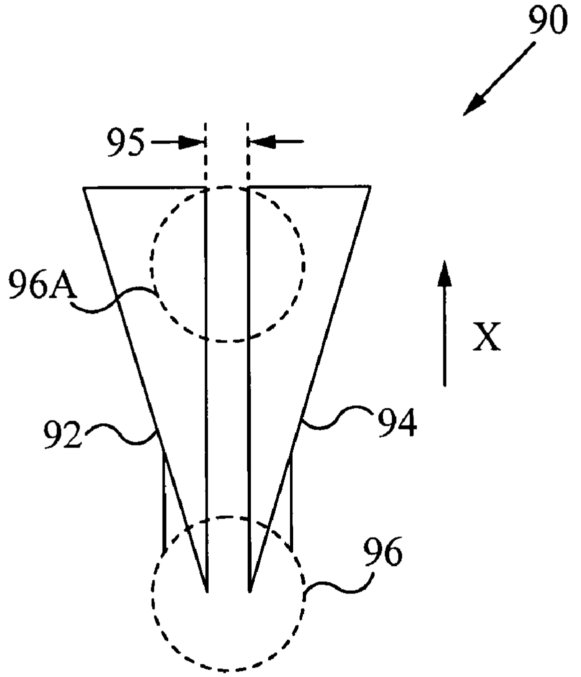
FIG. 11 is a top view of a variable resistance device exhibiting effective parallel path resistance characteristics in accordance with another embodiment of the invention.

The effective resistance of a device exhibits parallel path resistance behavior if the straight resistance component is kept substantially constant. FIGS. 10*a*, 10*b*, and 11 show examples of variable resistance devices that operate primarily in the parallel path resistance mode.

In FIG. 10*a*, the variable resistance device 80 includes a pair of conductors 82, 84 which are spaced from each other by a gap 85 which is substantially constant in size. The conductor surfaces of the conductors 82, 84 are generally planar and rectangular with straight edges defining the gap 85. The edges which define the gap can have nonlinear shapes in other embodiments. A resistive footprint 86 bridges across the gap between the conductors 82, 84 and changes in size to footprints 86*a*, 86*b*. In the embodiment shown, the resistive footprint 86 is circular and makes movable contact with the conductors 82, 84 in a generally symmetrical manner as it increases in size from footprint 86 to 86*a* and increases even more from footprint 86*a* to 86*b*.

Alternative footprint shapes and nonsymmetrical contacts are able to be employed in other embodiments. The movable contact is able to be produced by a resistive resilient member similar to the resistance member 68 shown in FIG. 9*b* with the joystick 70 for manipulating the movement of the footprint 86. The change in the area of the footprint 86 is able to be generated by increasing the deformation of the resistive resilient member 68. For instance, a larger force pushing downward on the joystick 70 against the resistive resilient member 68 produces greater deformation of the resistive resilient member 68 and thus a larger footprint size.

Because the gap 85 between the conductors 82, 84 which is bridged by the resistive footprint 86 is substantially constant, the straight resistance component of the overall resistance is substantially constant. The effective resistance of the variable resistance device 80 is thus dictated by the parallel path resistance component. The number of parallel paths increases with an increase in the contact areas between the resistive footprint from 86 to 86*a*, 86*b* and the conductors 82, 84. The parallel path resistance component decreases with an increase in parallel paths produced by the increase in the contact areas. Thus, the effective resistance of the device 80 decreases with an increase in the contact area from the footprint 86 to footprints 86*a*, 86*b*. In the embodiment shown in FIG. 10*a*, the contact areas between the resistive footprint 86 and the conductors 82, 84 increase continuously in the direction of movable contact from the footprint 86 to footprint 86*a*, and then from footprint 86*a* to footprint 86*b*. In such a configuration, the parallel path resistance component between the conductors 82, 84 decreases in the direction of the movable contact. The change in the contact areas is able to be selected to provide a particular resistance response for the variable resistance device 80 such as, for example, a resistance that decreases in a linear manner with respect to the displacement of the footprint 86 in the direction to footprints 86*a*, 86*b*.

Although FIG. 10*a* shows a moving resistive footprint 86, a similar variable resistance device 80' exhibits similar characteristics for a stationary footprint 86 that changes in size to footprints 86*a*, 86*b* as illustrated in FIG. 10*b*. Further, FIG. 10*a* shows a footprint 86 that maintains its circular shape, but a footprint in an alternative embodiment is able to change shape (e.g., from circular to elliptical) in addition to size.

In FIG. 11, a variable resistance device 90 includes a pair of conductors 92, 94 having non-uniformly shaped conductor surfaces for making contact with a resistive footprint 96. The conductor surfaces are spaced by a substantially constant gap 95 in a manner similar to that shown in FIG. 10*a*. The resistive footprint 96 is circular and makes movable contact with the conductor surfaces which are triangular in this embodiment. The resistive footprint 96 maintains a substantially constant size when it moves over the conductor surfaces in the direction X, from the footprint 96 to the footprint 96*a*. The device 90 is similar to the device 80 in FIG. 10*a* except for the triangular conductor surfaces and the substantially constant footprint size. As in the device 80 in FIG. 10*a*, the constant gap 95 in the device 90 produces a straight resistance component that is substantially constant. When the resistive footprint 96 moves relative to the conductors 92, 94 to footprint 96*a*, the contact areas between the footprint 96 and the conductors 92, 94 increase due to the shape of the triangular conductor surfaces, thereby increasing the amount of parallel paths and lowering the parallel path resistance component. The contact areas change in size in the device 90 of FIG. 10*a* due to variations in the footprint size, while the contact areas change in size in the device 90 of FIG. 11 due to variations in the shape of the conductor surfaces. As compared to the device 80 of FIG. 10*a*, the variable resistance device 90 represents a different way of selecting the geometry, contact locations, and contact areas to produce an alternative embodiment that operates similarly in the parallel path resistance mode.

Another way to ensure that a variable resistance device operates primarily in the parallel path resistance mode is to manipulate the geometric factors and contact variances such that the parallel path resistance component is substantially larger than the straight resistance component. In this way, the change in the effective resistance is at least substantially equal to the change in the parallel path resistance component.

Figure 12:
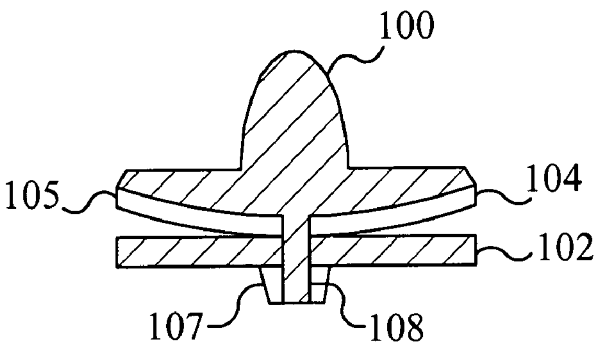
FIG. 12 is a partial side cross-sectional view of a variable resistance device exhibiting effective parallel path resistance characteristics in accordance with another embodiment of the invention.

An example of a variable resistance device in which the parallel path resistance component is dominant is a joystick device 100 shown in FIG. 12. The variable resistance joystick device 100 includes a conductive substrate 102, a resistive resilient transducer 104 having a curved resistive surface 105 in rolling contact with the surface of the conductive substrate 102, and a stick 106 coupled with the transducer 104 for moving the transducer 104 relative to the conductive substrate 102. A conductive spring 108 extends through an opening in the central region of the conductive substrate 102 and resiliently couples a center contact portion 109 of the transducer 104 to a fixed pivot region 107 relative to the conductive substrate 102. The spring 108 is electrically insulated from the conductive substrate 102. In the embodiment shown, a voltage is applied through the conductive spring 108 to the center portion of the resistive resilient transducer 104. In one embodiment, the resistive resilient transducer 104 has a small thickness which is substantially smaller than the square root of the surface area of the resistive surface 105.

Figure 13A:
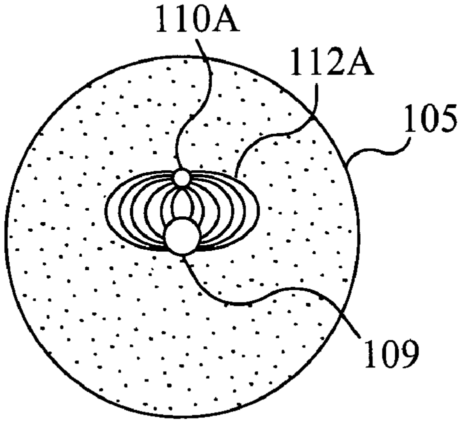
FIGS. 13*a-c* are schematic views illustrating parallel paths for different contact locations in the variable resistance device of FIG. 12.
Figure 13B:
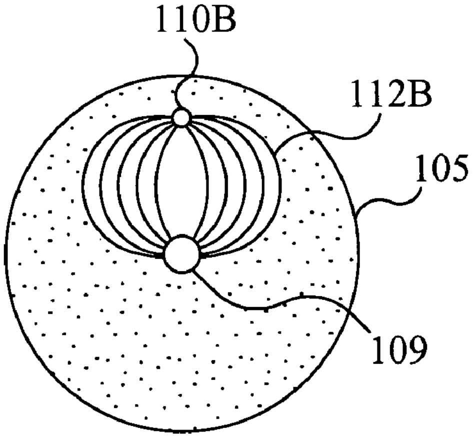
Figure 13C:
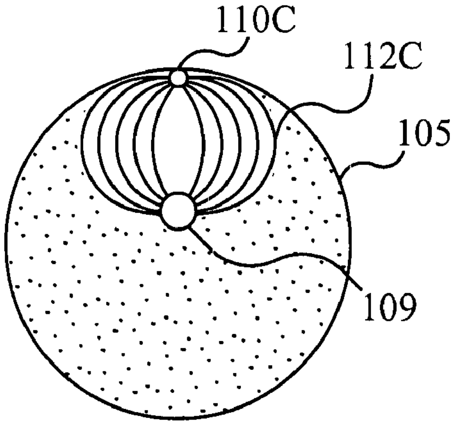

In operation, a user applies a force on the stick 106 to roll the transducer 104 with respect to the conductive substrate 102 while the spring 108 pivots about the pivot region 107. The resistive surface 105 makes movable contact with the surface of the conductive substrate 102. FIGS. 13*a-c* show several movable contact locations or footprints 110*a*, 110*b*, 110*c* on the resistive surface 105 of the transducer 104 at different distances from the contact portion 109 where the voltage is applied. Current flows from the conductive spring 108 to the center contact portion 109 of the transducer 104 through the resistive resilient material of the transducer 104 to the conductive substrate 102 at the contact location (110*a*, 110*b*, 110*c*) where the voltage is read. There will be a drop in voltage from the voltage source at the contact portion 109 to the contact location with the conductive substrate 102 as the current travels through the resistive resilient material of the transducer 104.

FIGS. 13*a-c* schematically illustrate parallel paths 112*a-c* on the resistive surface 105 between the contact portion 109 and the movable contact locations 110*a-c*. FIGS. 13*a-c* do not show the parallel paths through the body of the resistive resilient transducer 104 but only the parallel paths 112*a-c* over the resistive surface 105, which are representative of the amount of parallel paths through the body of the transducer 104 between the contact portion 109 and the movable contact locations 110*a-c*. The contact area sizes of the contact locations 110*a-c* preferably are substantially constant. The shape of the contact area typically is also generally constant.

In FIG. 13*a*, both the contact portion 109 for the applied voltage and the contact location 110*a* are disposed generally in a central region of the resistive surface 105 and away from the outer edge of the resistive surface 105. In this configuration, both the contact portion 109 and the contact location 110*a* are surrounded by resistive resilient material. The current flows from the contact portion 109 in an array of parallel paths 112*a* in many directions into the resistive resilient material of the transducer 104 surrounding the contact portion 109, toward the contact location 110*a* also from different directions surrounding the contact location 110*a*. In contrast, the straight resistance component between the contact portion 109 and the contact location 110*a* as defined by the distance between them is significantly smaller than the dominant parallel path resistance component. Due to the short distance between the contact portion 109 and the contact location 112*a* which limits the amount of resistive resilient material through which the current travels, the amount of parallel paths 112*a* is relatively small.

In FIG. 13*b*, the contact location 110*b* moves farther away from the contact portion 109, but still stays generally in a central region of the resistive surface 105 away from the outer edge of the resistive surface 105. Because the contact location 110*b* is spaced farther from the contact portion 109, there is a larger amount of resistive resilient material and thus a larger amount of parallel paths 112*b* for the current to flow than in FIG. 13*a*. The increase in the number of parallel paths causes a decrease in the parallel path resistance component. The greater distance between the contact portion 109 and the contact location 110*b* produces an increase in the straight resistance component, but it is still a small component compared to the parallel path component due to the presence of the large amount of parallel paths which more than compensates for the increase in straight resistance. Therefore, the effective resistance decreases as the contact location 110*b* moves farther away from the fixed center contact portion 109.

Eventually the additional generation of parallel paths decreases as the distance increases between the contact portion 109 and the contact location increases. In the embodiment shown in FIG. 13*c*, this occurs when the contact location 110*c* approaches the edge of the resistive surface 105, where the contact location 110*c* is no longer surrounded by as much resistive resilient material as in FIGS. 13*a* and 13*b*. The resistive resilient material available for the parallel paths 112*c* is limited by geometric factors. Meanwhile, the straight resistance component continues to increase as a result of the increase in distance.

Figure 14:
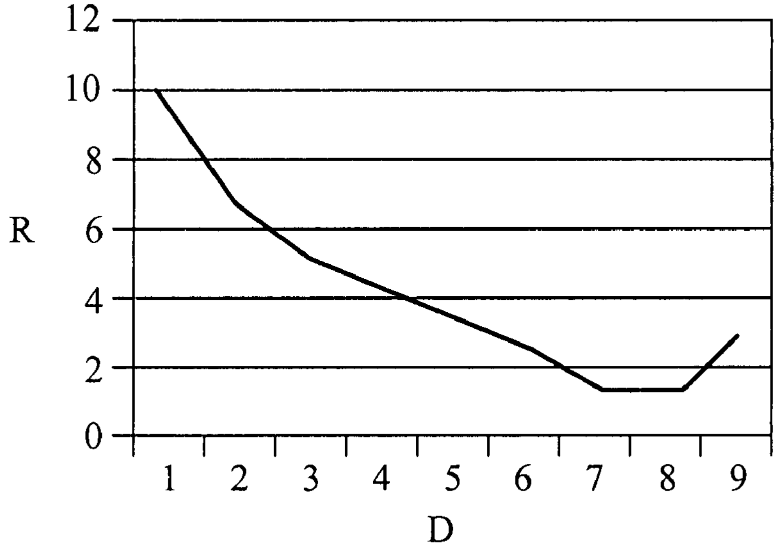
FIG. 14 is a plot of the effective resistance as a function of distance between contact locations for the variable resistance device of FIG. 12.

FIG. 14 is a plot of the effective resistance R as a function of the footprint distance D from the center contact portion 109 for the joystick device 100. The effective resistance R initially exhibits parallel path resistance characteristics, and decreases as the contact moves from the contact location 110*a* in FIG. 13*a* to the contact location 110*b* in FIG. 13*b*. A portion of the resistance curve in FIG. 14 is substantially linear. This occurs where the distance D between the center contact portion 109 and the contact location 110*b* is in the medium distance range between about 2.5 and 6.5 normalized with respect to the radius of the resistive surface 105. When the contact location 110*c* approaches the edge of the resistive surface 105 as shown in FIG. 13*c*, a cross-over occurs where the straight resistance component overtakes the parallel path resistance component and becomes the dominant component. This cross-over is seen in FIG. 14 as a rise in the effective resistance with an increase in footprint distance to about 7.5-8.5 near the edge of the resistive surface 105. The cross-over phenomenon is able to be used in certain applications as a switch activated by the movement of the contact location 112*c* toward the edge of the resistive surface 105.

Figure 15A:
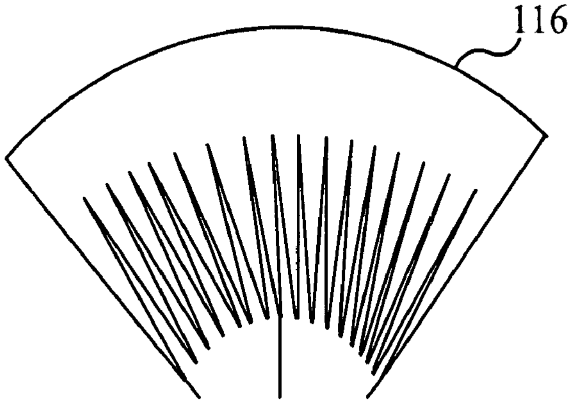
FIG. 15*a* is a schematic view of a conductive trace pattern of a segment of the substrate in the variable resistance device of FIG. 12 in accordance with another embodiment of the invention.
Figure 15B:
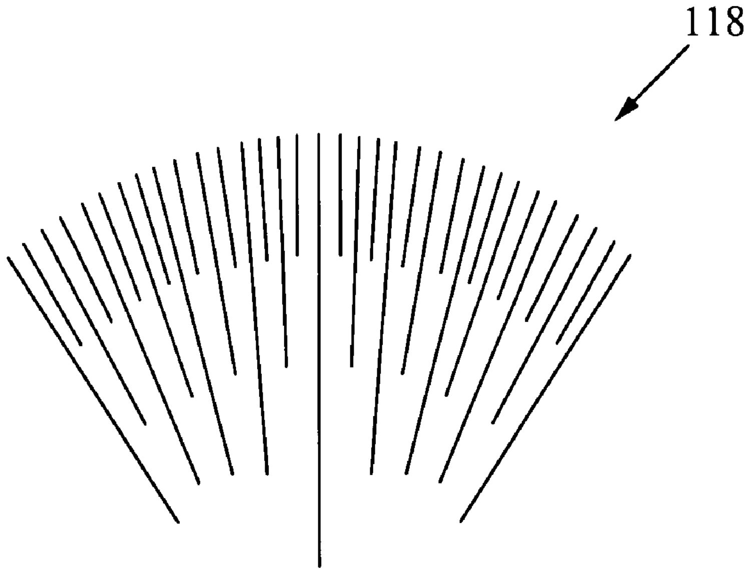
FIG. 15*b* is a schematic view of another conductive trace pattern of a segment of the substrate in the variable resistance device of FIG. 12 in accordance with another embodiment of the invention.

In FIG. 12, the surface of the conductive substrate 102 over which the resistive resilient transducer 104 rolls and makes movable contact is assumed to be divided into two or more segments (typically four) to provide directional movement in two axes. FIGS. 15*a* and 15*b* show segments of alternative conductive patterns that are able to be used to modify the resistance characteristics of the variable resistance device 100 in FIG. 12. FIG. 15*a* shows a continuous conductive pattern 116 on the substrate, while the FIG. 15*b* shows a conductive pattern 118 made up of individual conductive traces. In both cases, the amount of conductive material for contacting with the footprint of the resistive surface 105 increases as the contact location moves farther away from the center contact portion 109. Thus, the effective contact area between the resistive footprint and the conductive pattern 116, 118 increases in size as the footprint distance from the center contact portion 109 increases (even though the size of the footprint remains generally constant), so that the increase in the amount of parallel paths is amplified with respect to the increase in the footprint distance. As a result, the effective resistance exhibits more pronounced parallel path characteristics until the resistive footprint approaches the edge of the resistive surface 105. The embodiments in FIGS. 15*a* and 15*b* introduce the additional factor of varying the effective contact area to manipulate the effective resistance characteristics of the variable resistance device 100.

As discussed above, the straight path resistance component becomes dominant as the contact location 112*c* of the resistive footprint approaches the edge of the resistive surface 105 as shown in FIGS. 13*c* and 14. A variable resistance device 120, shown in exploded view in FIG. 16, makes use of this property. The device 120 includes a thin sheet of a resistive resilient member 122 which is rectangular in the embodiment shown. One corner 124 of the member 122 is energized with an applied voltage V, while another corner 126 is grounded. Alternatively, the corner 126 is energized with a voltage different from V to create a voltage differential across the member 122. A conductive sheet 128 is disposed generally parallel with and spaced above the member 122. A force is able to be applied via a pen 129 or the like to bring the member 122 and the conductive sheet 128 in contact at various contact locations.

In this variable resistance device 120, the straight resistance component is dominant, partly because the formation of parallel paths is limited by the lack of resistive material surrounding the corners 124, 126. The number of parallel paths remains limited even when the contact with the conductive sheet 128 is made in the center region of the resistive resilient member 122 because the voltage is applied at the corner 124. In contrast, the application of the voltage in the center contact portion 109 in the device 100 shown in FIG. 12 allows current to flow in many directions into the resistive resilient material that surrounds the center contact portion 109.

The above examples illustrate some of the ways of controlling the geometry and contact variances to manipulate the straight resistance and parallel path resistance components to produce an effective resistance having certain desired characteristics.

It will be appreciated variable resistances in accordance with the present invention are able to be used to generate signals that correspond, for example, to locations on a grid. These signals are generally coupled to analog-to-digital converters as input to cell phones, games, and other devices that rely on positional signals and haptic events, to name only a few uses.

C. Mechanical Characteristics

Another factor to consider when designing a variable resistance device is the selection of mechanical characteristics for the resistive resilient member and the conductors. This includes, for example, the shapes of the components and their structural disposition that dictate how they interact with each other and make electrical contacts.

Figure 16:
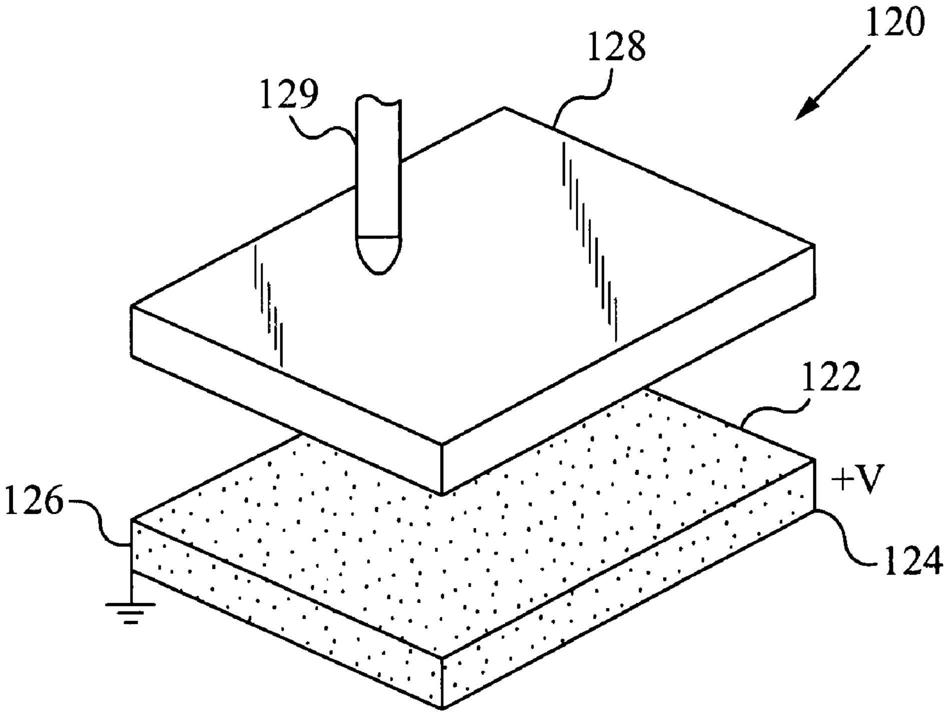
FIG. 16 is an exploded perspective view of a variable resistance device exhibiting effective straight resistance characteristics in accordance with another embodiment of the invention.

As some examples, the use of a resistive resilient strip 42 to form a potentiometer is illustrated in FIGS. 5*a-c* and 6. The use of conductive bars 62, 64 are shown in FIGS. 9*a* and 9*b*. A flat sheet of resistive resilient sheet 102 is illustrated in FIG. 16. In the configuration of FIG. 16, typically two corners of the resilient sheet 122 are energized with voltage potentials and the remaining two corners are grounded. A voltage is read through the contact between the conductive sheet 128 and the resistive resilient sheet 122 and processed to determine the contact location over an X-Y Cartesian coordinate system using methods known in the art. The variable resistance device 120 of this type is applicable, for example, as a mouse pointer or other control interface tool.

Resistive resilient members in the form of curved sheets are shown in FIGS. 9*b* and 12. The examples of FIGS. 9*b* and 12 represent joysticks or joystick-like structures, but the configuration is able to be used in other applications such as pressure sensors. For instance, the force applied to a curved resistive resilient sheet is able to be caused by a variable pressure and the contact area between the curved resistive resilient sheet and a conductive substrate is proportional to the level of the applied pressure. In this way, the change in resistance is related to the change in pressure so that resistance measurements are able to be used to compute the applied pressure.

Figure 17:
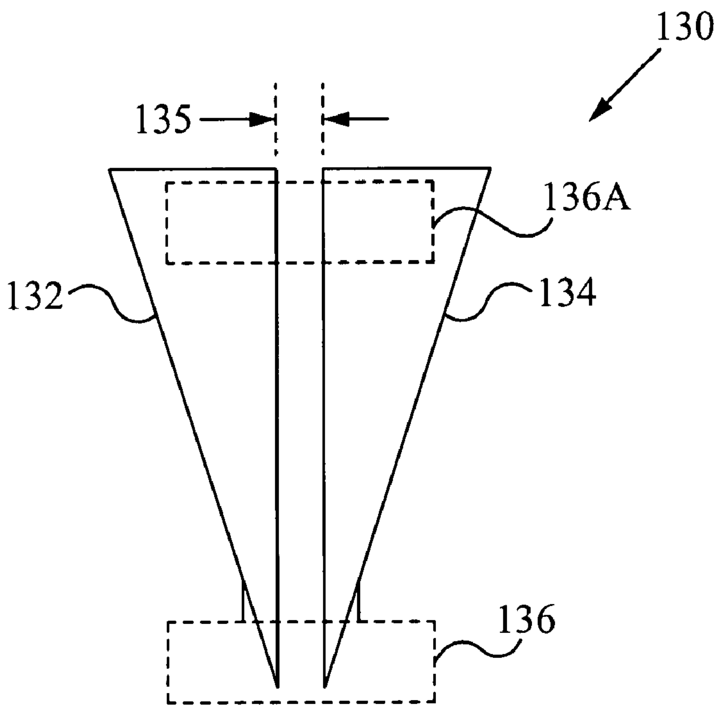
FIG. 17 is a schematic view of a variable resistance device exhibiting effective parallel path resistance characteristics with a rectangular resistive footprint in accordance with another embodiment of the invention.

Another mechanical shape is a rod. In FIG. 8, the example of a conductive rod 56 is shown. A rod produces a generally rectangular footprint. The rod configuration is also able to be used for a resistive resilient member to produce a rectangular resistive footprint. An example is the variable resistance device 130 shown in FIG. 17, which is similar to the device 90 of FIG. 11. The device 130 has a similar pair of conductors 132, 134 spaced by a similar gap 135. In FIG. 17, however, the resistive footprints 136, 136*a* are rectangular as opposed to the circular footprints 96, 96*a* in FIG. 11. The change in the shape of the footprint 106 produces a different resistance response, but the effective resistance is still governed by the parallel path resistance component as in the device 90 of FIG. 117.

Figure 18:
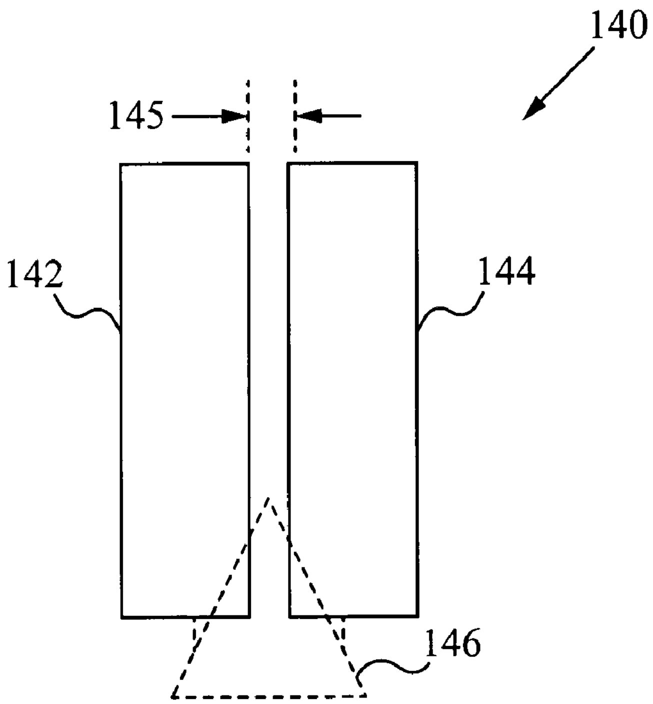
FIG. 18 is a schematic view of a variable resistance device exhibiting effective parallel path resistance characteristics with a triangular resistive footprint in accordance with another embodiment of the invention.

Yet another mechanical shape for a footprint is that of a triangle, such as produced by a cone or a wedge. In FIG. 18, a variable resistance device 140 is similar to the device 80 in FIG. 9, and includes a pair of conductors 142, 144 spaced by a gap 145. Instead of a circular resistive footprint 86 that changes in size, the device 140 uses a triangular resistive footprint 146 that makes movable contact with the conductors 142, 144 in the direction shown by the arrow X. As a result, the contact areas between the resistive footprint 146 and the conductors 142, 144 increase in the X direction even though the footprint 146 is constant in size, creating a similar effect as that illustrated in FIG. 10. In this embodiment, due to the substantial linear increase in contact areas, the resistance response is also substantially linear.

Figure 19:
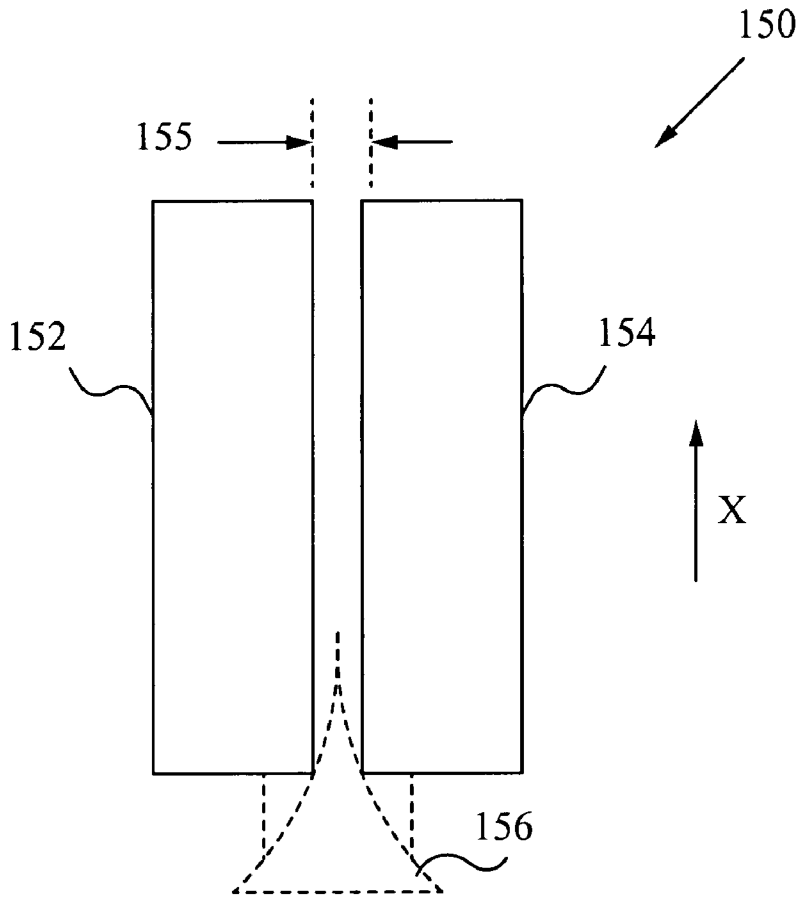
FIG. 19 is a schematic view of a variable resistance device exhibiting effective parallel path resistance characteristics with a logarithmic resistive footprint in accordance with another embodiment of the invention.
Figure 20:
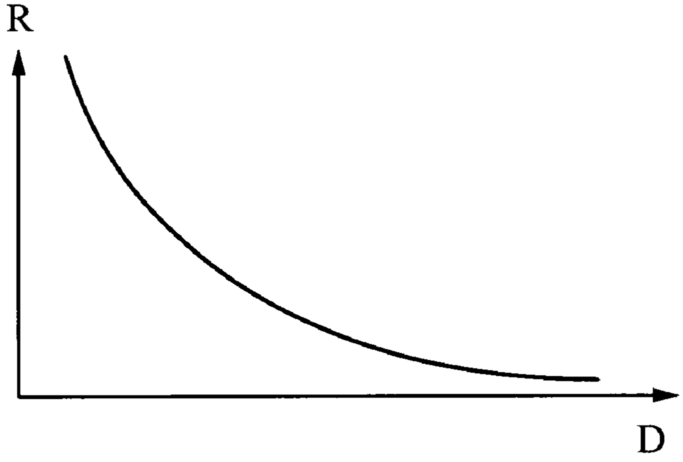
FIG. 20 is a plot of the effective resistance as a function of displacement of the resistive footprint for the variable resistance device of FIG. 19.

In the variable resistance device 150 of FIG. 19, the shape of the triangular resistive footprint 156 is modified to produce a logarithmic resistance response when it makes movable contact with the conductors 152, 154 separated by a gap 155 in the direction X. The change in resistance R is proportional to the logarithm of the displacement D of the resistive footprint 156 in the direction X. A plot of the change in resistance R versus the displacement D of the resistive footprint 156 is shown in FIG. 20.

Figure 21:
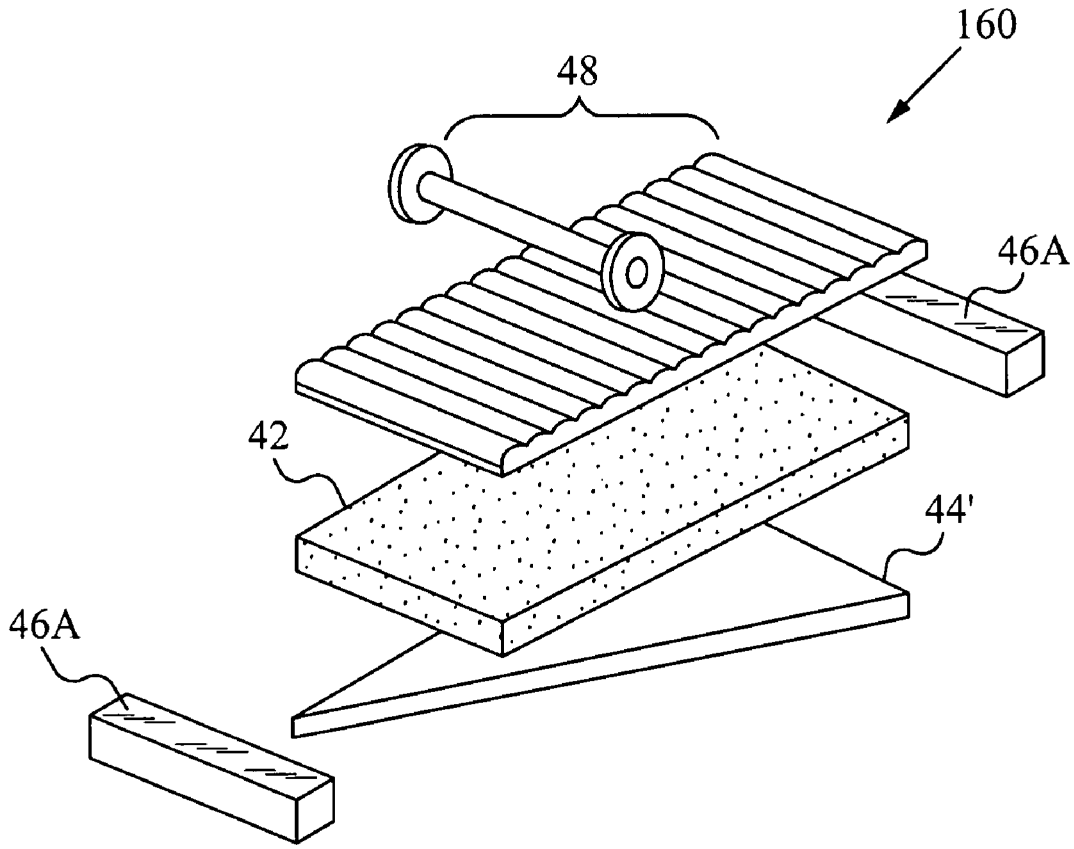
FIG. 21 is an exploded perspective view of a variable resistance device exhibiting effective straight resistance characteristics with a logarithmic conductor footprint in accordance with another embodiment of the invention.
Figure 22:
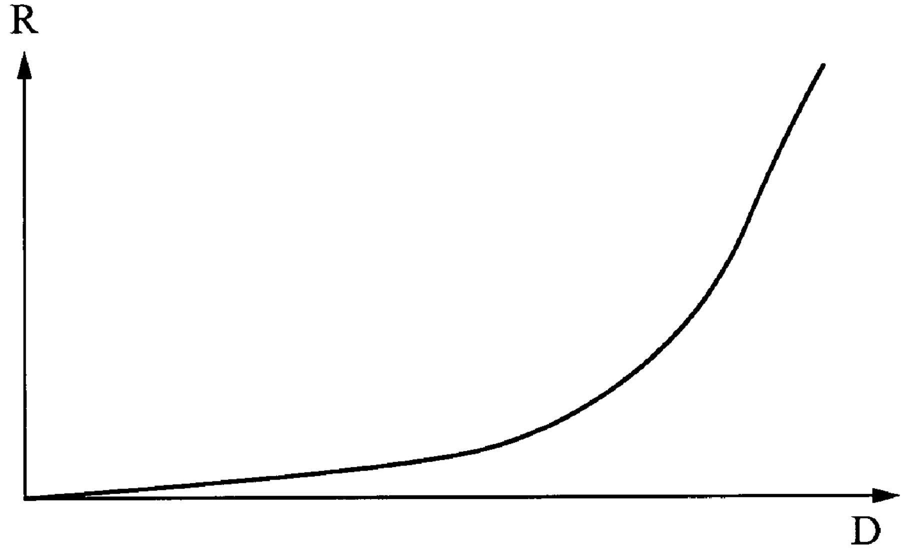
FIG. 22 is a plot of the effective resistance as a function of contact location between the resistive resilient transducer and the conductor footprint for the variable resistance device of FIG. 21.

A logarithmic resistance response is also able to be produced using the embodiment of FIGS. 5*a-c* and 6 if the rectangular conductive member 14 is replaced by a generally triangular conductive member 44', as illustrated in the variable resistance device 160 of FIG. 21. The conductor 46*a* is grounded while the conductor 46*b* is energized with a voltage V. FIG. 22 shows a plot of the resistance R versus the distance in the direction Y, the distance of the contact location between the resistive resilient transducer 42 and the conductive member 44' measured from the end of the transducer 42 adjacent the conductor 46*b* where the voltage V is applied.

As illustrated by the above examples, resistive resilient materials are able to be shaped and deformed in ways that facilitate the design of variable resistance devices having a variety of different geometries and applications. Furthermore, devices made of resistive resilient materials are often more reliable. For instance, the potentiometer 40 shown in FIGS. 5*a-c* and 6 provides a resistive resilient transducer 42 having a relatively large contact area as compared to those in conventional devices. The problem of wear is lessened. The large contact area also renders the potentiometer 40 less sensitive than conventional devices to contamination such as in the presence of dust particles.

In accordance with the present invention, variable resistance devices are able to be configured to produce variable resistance zones. By configuring multiple variable resistance devices, larger zones (e.g., areas that can track movement, such as a touchpad on a gaming devices) can be formed by merely combining the discrete variable resistance devices.

Figure 23A:
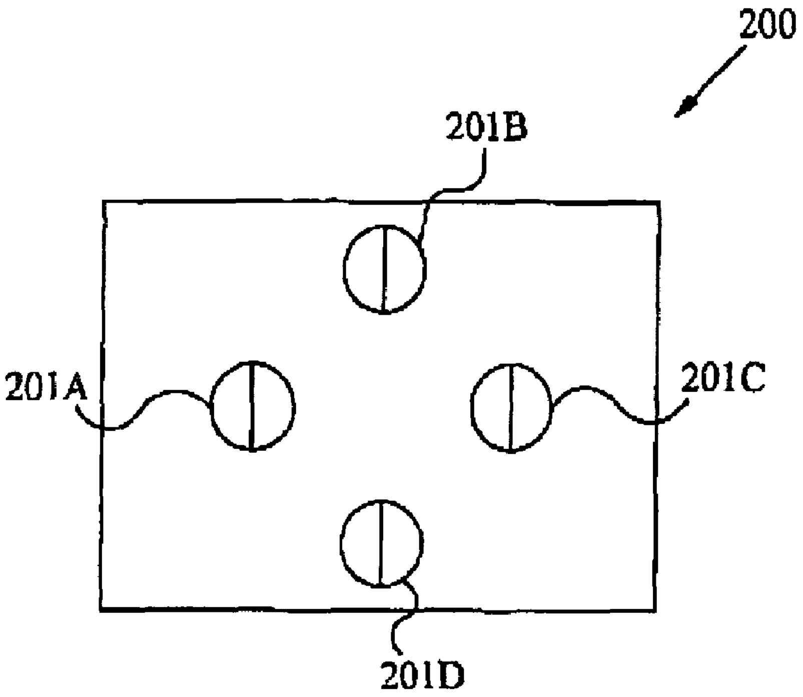
FIG. 23*a* is a schematic view of a substrate with four (4) juxtaposed first and second conductive element pairs in accordance with embodiments of the present invention.
Figure 23B:
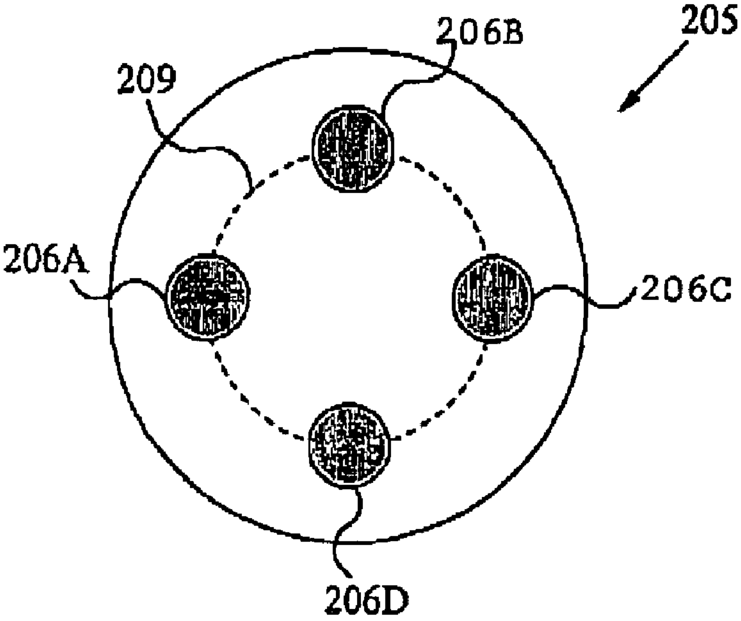
FIG. 23*b* is a schematic view of 4 sets of resistive material on a disc actuator in accordance with embodiments of the present invention.

FIG. 23*a* and FIG. 23*b* illustrates the earlier exemplary embodiment of the present invention disclosing a method of producing multiple variable resistance zones. FIG. 23*a* is a top view of a printed circuit board (PCB) substrate 200 having four electrically conductive elements 201A-D. The elements 201*a* and 201D form a set of juxtaposed conducting pairs and the elements 201C and 201D forma a set of juxtaposed conducting pairs. FIG. 23*b* is a bottom view of a disc actuator 205 with resistive materials 206A-D. Pairs of adjacent resistive materials 206A-D are said to form resistive pair sets. Each of the resistive material sets 206A-D is coupled to a voltage source, preferably a single voltage source.

In operation, the exemplary resistive material 206A is contacted, so that it contacts the electrically conductive element 201A. The exemplary resistive material set 201A and 206A thus function as the variable resistor 40 of FIGS. 5*a-c*. Together, the variable resistive sets 201A-D and 206A-D thus function as a variable resistive zone, where movement (by way, for example, of resistances) can be tracked through and between zones. Preferably, the variable resistance zone is used by is coupled to an analog-to-digital converter, which converts the signal from the variable resistance zone to signals usable by the electronic device.

Figure 24A:
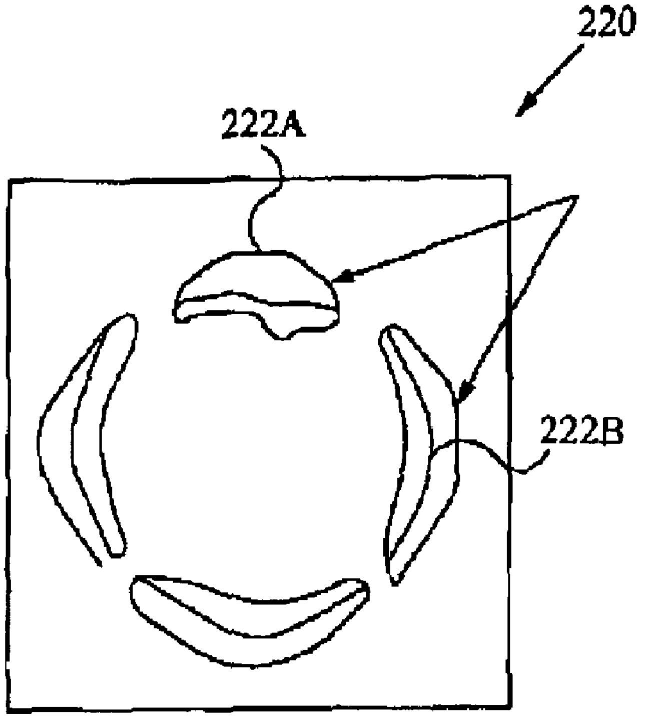
FIG. 24*a* is a schematic view of a substrate with 4 juxtaposed first and second conductive element pairs in an alternative geometric shape in accordance with embodiments of the present invention.
Figure 24B:
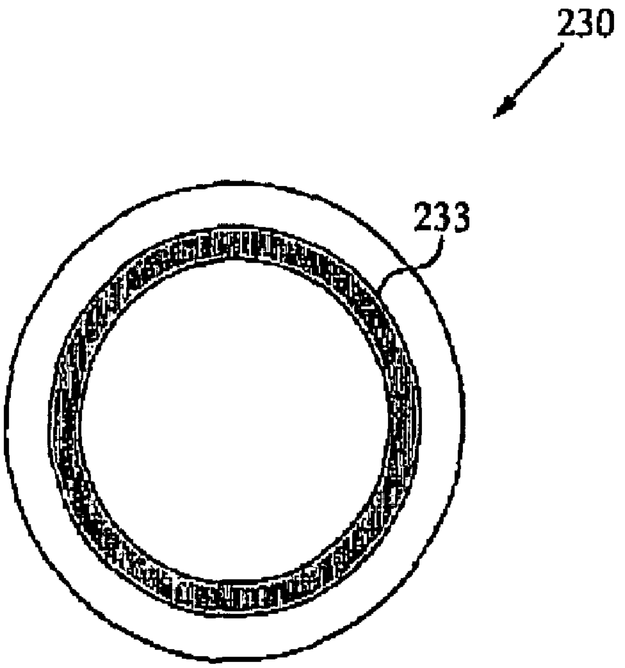
FIG. 24*b* is a schematic view of a single set of resistive material on a disc actuator in accordance with embodiments of the present invention.

Further, FIGS. 24*a-b* illustrate a variation of geometric shapes used for the sets of conductive elements. FIG. 24*a*, for example, is a top view 220 of PCB substrate with paired conductive element sets. FIG. 24*a* shows electrically conductive first and second elements 222A and 222B juxtaposed to form paired sets. FIG. 24*b* is a bottom view of a disc actuator 230 with resistive material. The actuator 230 includes a continuous resistive material 233 to be positioned over electrically conductive first and second elements juxtaposed as paired sets.

Figure 25:
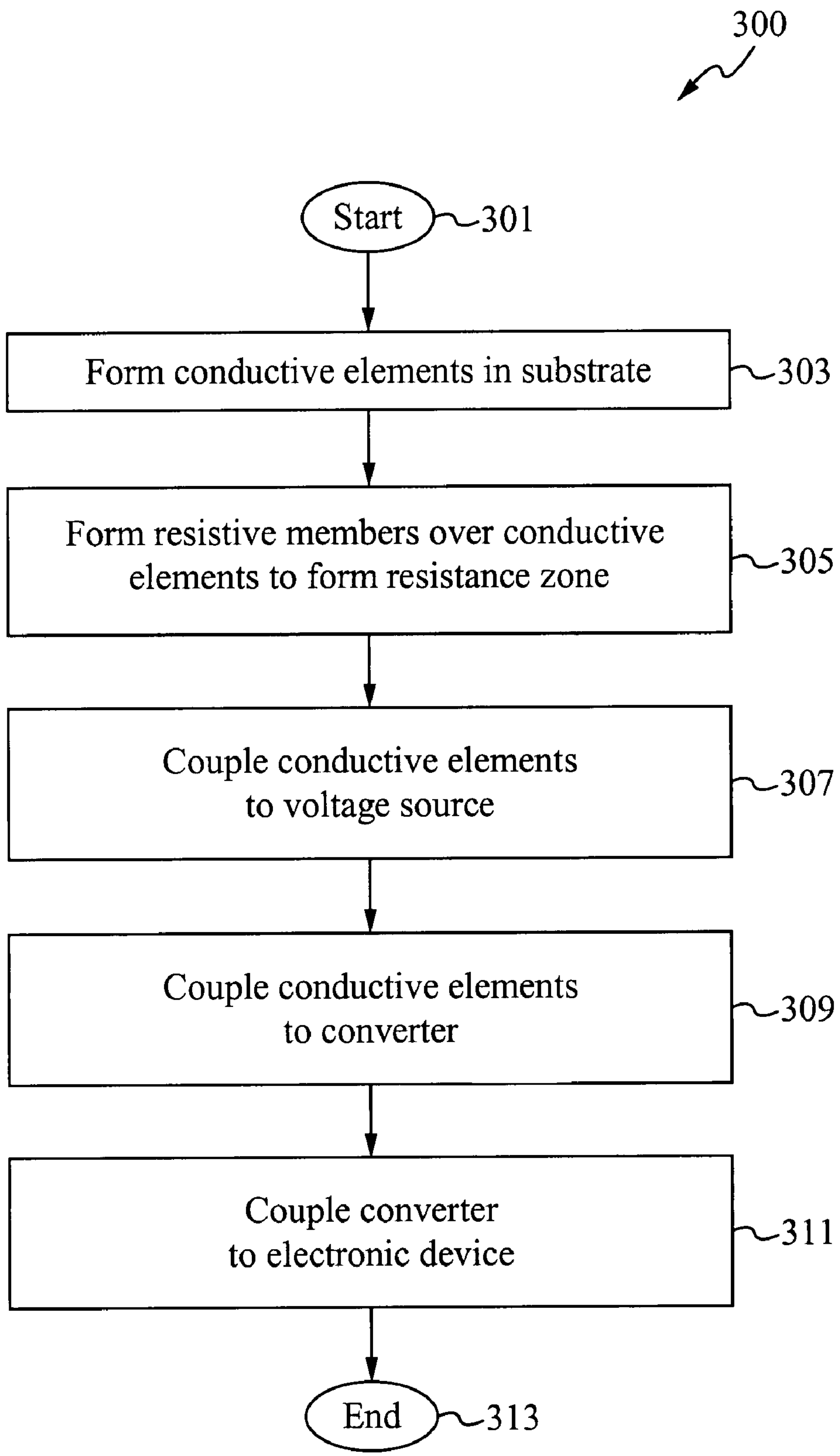
FIG. 25 shows the steps of a process for fabricating a device having a variable resistance zone in accordance with the present invention.

FIG. 25 is a flow chart shows the steps 300 of a process for fabricating an electronic device having a variable resistance zone in accordance with the present invention. The process begins in the start step 301. In the step 303, conductive elements are formed in a substrate. In the step 305, resistive members are formed over the conductive elements to form a resistance zone. In the step 307, the conductive elements are coupled to a voltage source. In the step 309, the conductive elements are coupled to a converter, such as the converter 501 in FIG. 4A. In the step 311, the converter is coupled to an electronic device. The process ends in the step 311.

One embodiment of the present invention allows for the use of hardware mini-stops to provide haptic feedback; function as haptic feedback inducers or to limit the deformation of components, thereby ensuring accurate and uniform signal generation in accordance with the present invention.

Figure 26:
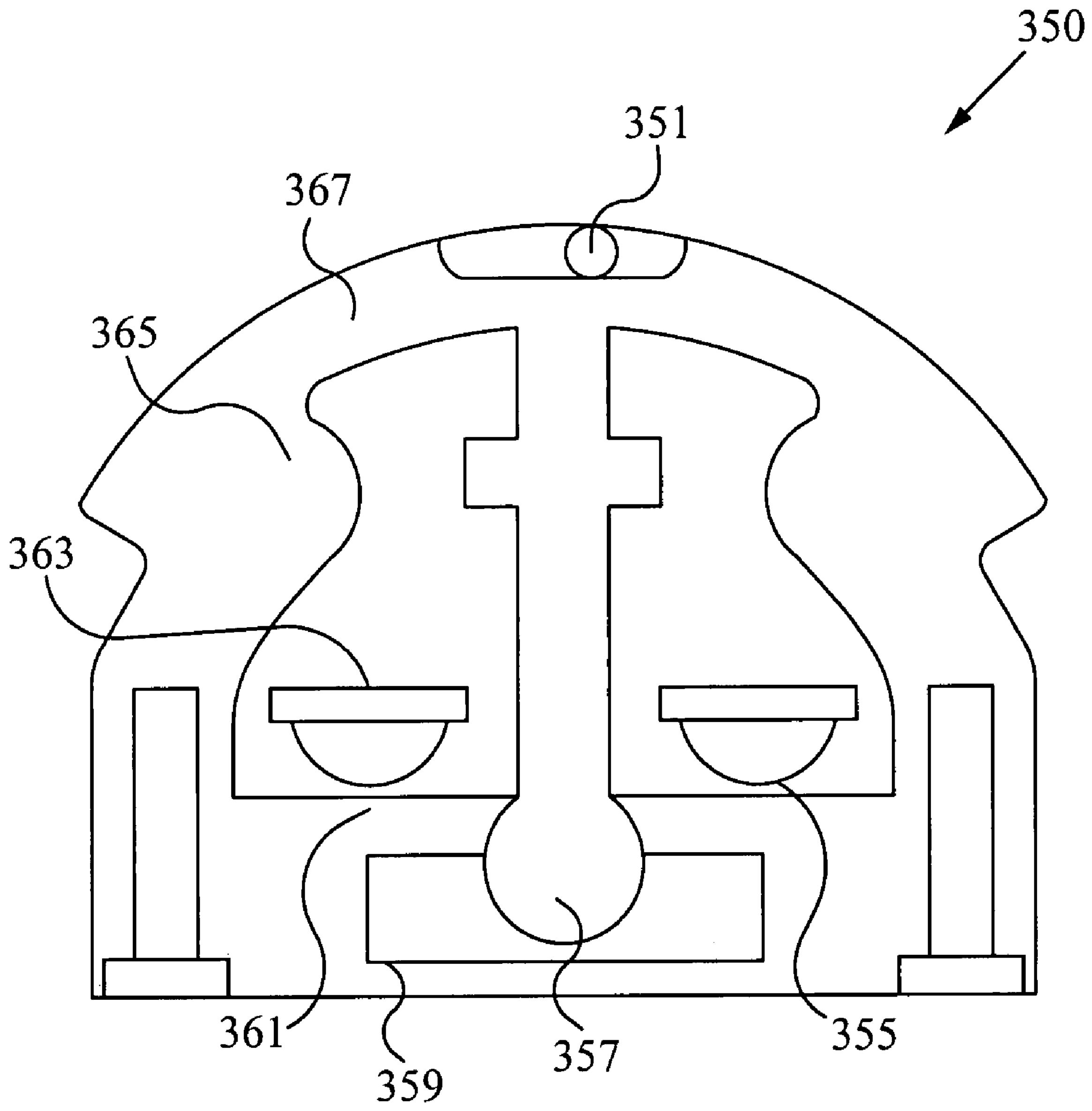
FIG. 26 is an enlarged cut-away schematic view of a navigation device incorporating three 3 juxtaposed first and second conductive element pairs in accordance with embodiments of the present invention.
Figure 27:
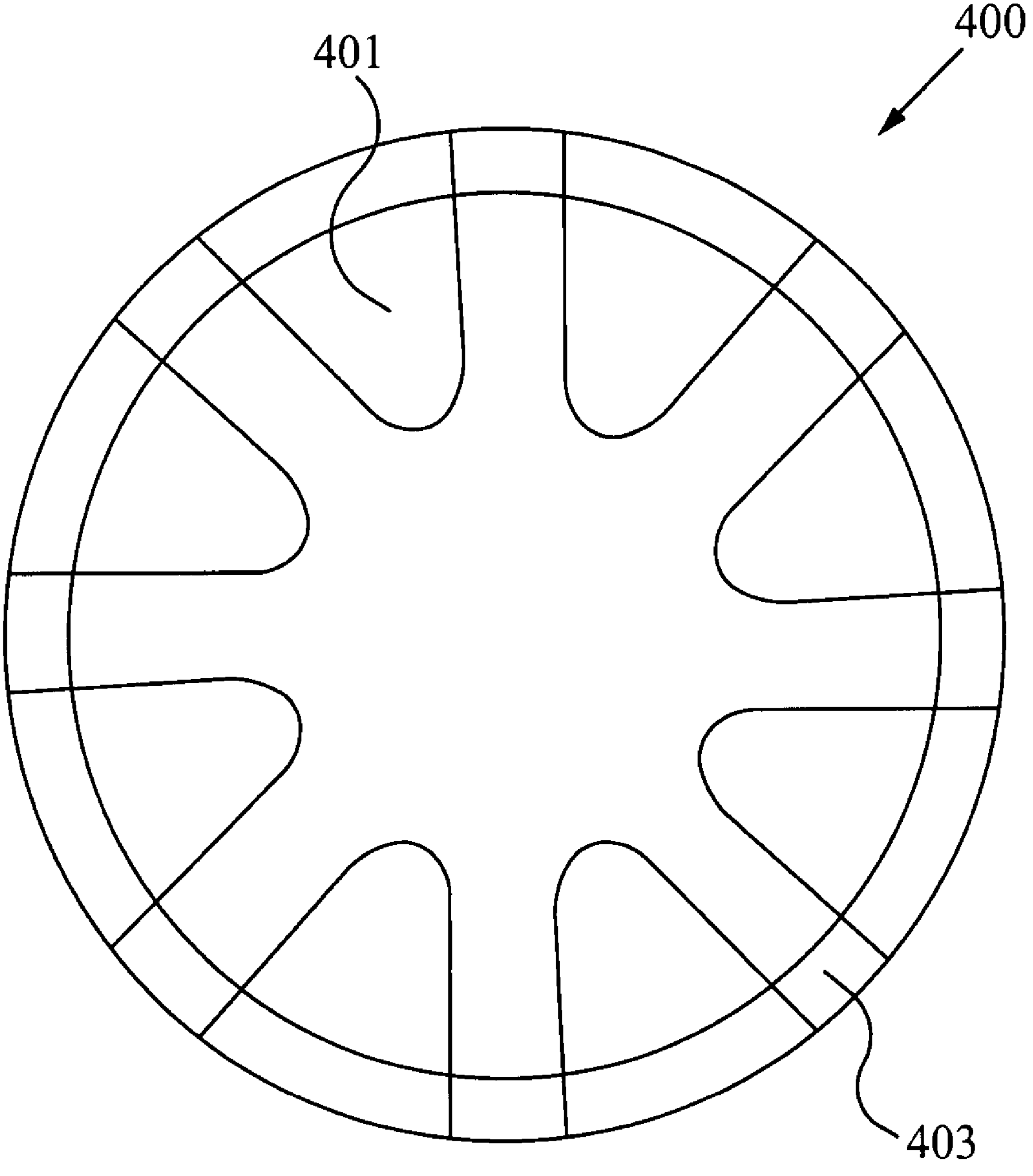
FIG. 27 is a schematic bottom view of a pointing device foot with ministop (hard stop) wedges juxtaposed to the sensor's resistive resilient material in accordance with embodiments of the present invention.
Figure 28:
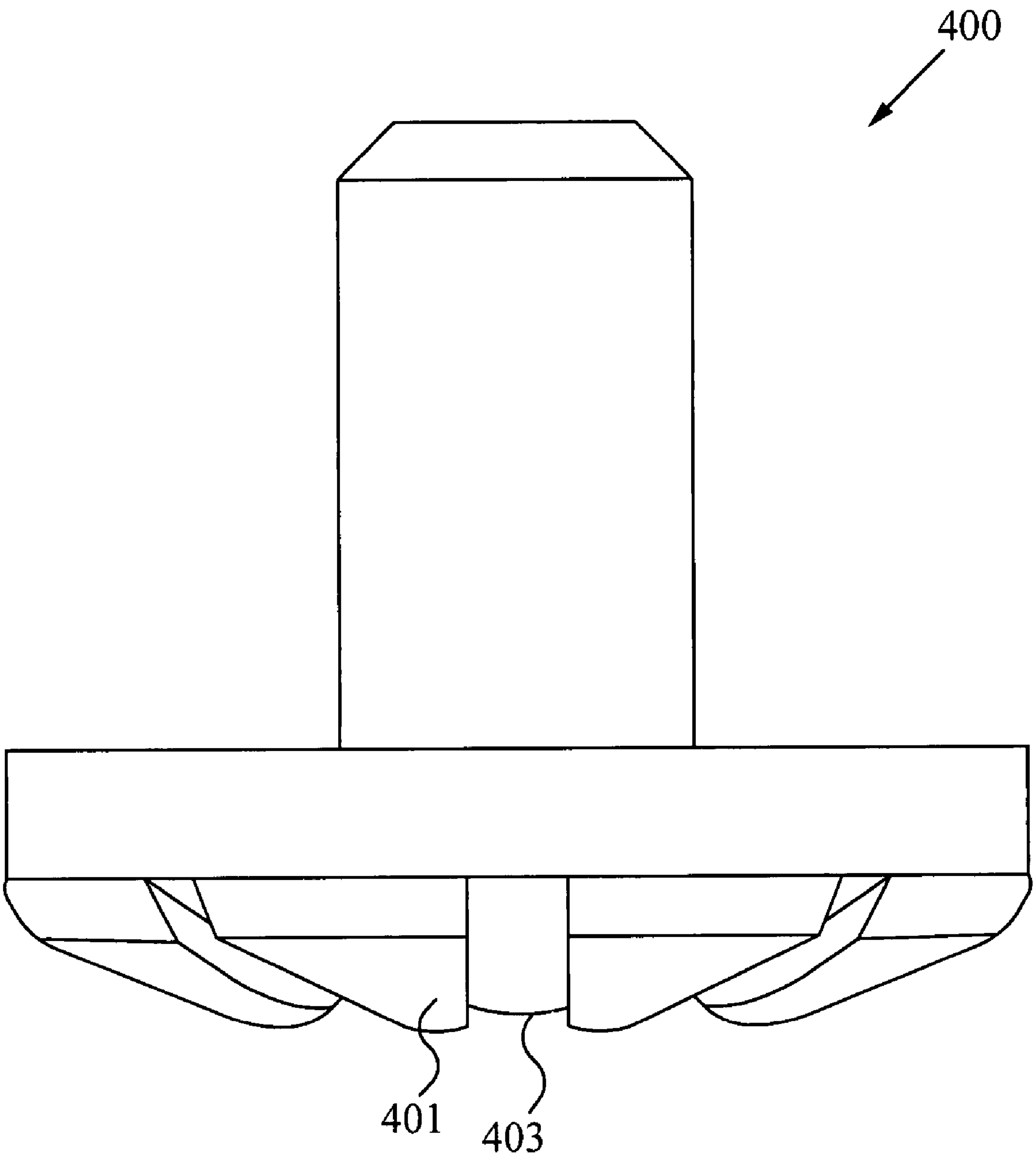
FIG. 28 is a schematic side view of a pointing device foot with ministop (hard stop) wedges juxtaposed to the sensor's resistive resilient material in accordance with embodiments of the present invention.

FIGS. 26-28 show hard stops in accordance with several embodiments of the present invention. FIG. 26 is a top view of a navigation device having a slot to accommodate joy sticks or filled with a traction dot 351, a spring (not shown) for a return force and to provide flatter pressure curves (long travel at orb and small travel at disk), a ball-and-socket joint 357, a dome switch 359, a flex pcb 361, a telepoint style disk and pills (resistive material) 363, a ball-and-socket joint 365, and an opaque orb for easy backlighting 367.

FIG. 27 shows a actuator 400 having wedge stops 401 and areas relieved for sensor rubber 403. FIG. 28 is a side view of the actuator 400.

Embodiments of the present invention are able to be combined in any number of ways to provide variable resistance zones, hard stops, and any combination of these.

Those skilled in the art will recognize many modifications to the embodiments of the present invention without departing from the scope of the present invention as defined by the appended claims.

What is claimed:

1. A system comprising:

an actuator having a perimeter;

a plurality of pressure-sensitive variable resistors arranged in laterally spaced apart relation and aligned along different respective portions of and within the perimeter of the actuator;

wherein the actuator is configured to transfer a pressure to a contact location on the plurality of pressure-sensitive variable resistors; and a converter coupled to the plurality of pressure sensitive variable resistors to map the pressure at the contact location to a pressure and location along a surface of the actuator.

2. The system of claim 1, wherein the plurality of pressure-senstive variable resistors comprise:

a substrate containing multiple conductive elements and multiple resistive members, wherein each of the multiple resistive members overlies and is spaced apart from a corresponding one of the multiple conductive elements; and a voltage source coupled to each of the multiple resistive members, wherein each of the resistive members is deformable to thereby contact a corresponding one of the multiple conductive elements at a location on the conductive element, thereby generating a voltage differential at the resistive member corresponding to the location on the corresponding conductive element.

3. The system of claim 2, wherein each of the multiple resistive members comprises an elastomeric resistive rubber material.

4. The system of claim 2, wherein the substrate further comprises a rigid or semi-rigid material that limits the pressure translated from the actuator to the multiple resistive members.

5. The system of claim 4, wherein the rigid or semi-rigid material comprises one of a polymer, silicone, silicone derivatives, derivatives, rubber, rubber derivatives, neoprene, neoprene derivatives, elastomers, elastomer derivatives, urethane, urethane derivatives, shape memory materials, and combinations thereof.

6. The system of claim 4, wherein the rigid or semi-rigid material has one of a conical surface, a spherical surface, and a flat surface.

7. The system of claim 4, wherein the rigid or semi-rigid material forms part of the multiple resistive members.

8. The system of claim 1, wherein the converter comprises an analog-to-digital converter.

9. The system of claim 1, further comprising an electronic device coupled to the converter and programmed to receive information related to the contact location along the surface of the actuator.

10. The system of claim 9, wherein the electronic device is one of a computer gaming device, a digital audio player, a digital camera, a mobile phone, a personal computer, a personal digital assistant, and a remote control.

11. A method of fabricating a system having multiple variable resistors forming a variable resistance zone comprising:

forming an actuator having a perimeter;

forming a plurality of pressure-sensitive variable resistors arranged in laterally spaced apart relation and aligned along different respective portions of and within the perimeter of the actuator;

wherein the actuator is configured to generate a pressure at a contact location on the multiple pressure-sensitive variable resistors; and coupling a converter to the plurality of pressure-sensitive variable resistors, wherein the converter is programmed to map the pressure at the contact location to a pressure and location along a surface of the actuator.

12. The method of claim 11, wherein the plurality of pressure-sensitive variable resistors comprise:

multiple conductive elements and multiple resistive members, wherein each of the multiple resistive members overlies and is spaced apart from a corresponding one of the multiple conductive elements.

13. The method of claim 12, further comprising coupling a voltage source to each of the multiple resistive members, wherein each of the resistive members is deformable to thereby contact a corresponding one of the multiple conductive elements at a location on the conductive element, thereby generating a voltage differential at the resistive member corresponding to the location on the corresponding conductive element.

14. The method of claim 12, wherein each of the multiple resistive members comprises an elastomeric resistive rubber material.

15. The method of claim 12, wherein the multiple resistive members are contained in a substrate, and wherein the substrate comprises a rigid or semi-rigid material that limits the pressure translated from the actuator to the multiple resistive members.

16. The method of claim 15, wherein the rigid or semi-rigid material comprises one of a polymer, silicone, silicone derivatives, derivatives, rubber, rubber derivatives, neoprene, neoprene derivatives, elastomers, elastomer derivatives, urethane, urethane derivatives, shape memory materials, and combinations thereof.

17. The method of claim 15, wherein the rigid or semi-rigid material has one of a conical surface, a spherical surface, and a flat surface.

18. The method of claim 15, wherein the rigid or semi-rigid material forms part of the multiple resistive members.

19. The method of claim 11, wherein the converter comprises an analog-to-digital converter.

20. The method off claim 11, further comprising coupling the converter to an electronic device programmed to receive location information, pressure-related information, or both along the surface of the actuator.

21. The method of claim 20, wherein the electronic device is one of a computer gaming device, a digital audio player, a digital camera, a mobile phone, a personal computer, a personal digital assistant, and a remote control.

* * * * *

UNITED STATES PATENT AND TRADEMARK OFFICE

CERTIFICATE OF CORRECTION

PATENT NO. : 7,684,953 B2
APPLICATION NO. : 11/705951
DATED : March 23, 2010
INVENTOR(S) : Feist et al.

It is certified that error appears in the above-identified patent and that said Letters Patent is hereby corrected as shown below:

| | |
|---|---|
| Column 2, Line 48 | Delete: "one a"<br>Insert: --one of a-- |
| Column 4, Line 9 | Delete: "view"<br>Insert: --views-- |
| Column 6, Line 14 | Delete: "to used"<br>Insert: --to be used-- |
| Column 6, Line 20 | Delete: "a forces"<br>Insert: --the forces-- |
| Column 6, Line 43 | Delete: "now"<br>Insert: --not-- |
| Column 7, Line 52 | Delete: "increases"<br>Insert: --which increases-- |
| Column 8, Line 24 | Delete: "an"<br>Insert: --and-- |
| Column 11, Line 64 | Delete: "the resilient resistive"<br>Insert: --the resistive-- |
| Column 13, Line 15 | Delete: "to"<br>Insert: --of-- |
| Column 18, Line 8 | Delete: "201*a*"<br>Insert: --201A-- |
| Column 18, Line 9 | Delete: "forma"<br>Insert: --form-- |

Signed and Sealed this

Thirty-first Day of August, 2010

David J. Kappos
*Director of the United States Patent and Trademark Office*

| | |
|---|---|
| Column 18, Line 22 | Delete: "zone is"<br>Insert: --zone it is-- |
| Column 18, Line 36 | Delete: "chart shows"<br>Insert: --chart that shows-- |
| Column 18, Line 62 | Delete: "a"<br>Insert: --an-- |
| Column 20, Line 51 | Delete: "off"<br>Insert: --of-- |